United States Patent
Shapira

(10) Patent No.: US 10,296,513 B2
(45) Date of Patent: May 21, 2019

(54) ACCESSING MESSAGING APPLICATIONS IN SEARCH

(71) Applicant: Samsung Electronics Co., Ltd., Suwon-si, Gyeonggi-do (KR)

(72) Inventor: Liron Shapira, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 14/849,223

(22) Filed: Sep. 9, 2015

(65) Prior Publication Data
US 2016/0162555 A1 Jun. 9, 2016

Related U.S. Application Data

(60) Provisional application No. 62/089,022, filed on Dec. 8, 2014.

(51) Int. Cl.
*H04L 12/58* (2006.01)
*G06F 3/0484* (2013.01)
*G06F 16/248* (2019.01)

(52) U.S. Cl.
CPC ........ *G06F 16/248* (2019.01); *G06F 3/04842* (2013.01); *H04L 51/046* (2013.01); *H04L 51/32* (2013.01)

(58) Field of Classification Search
CPC ............. G06F 17/30554; G06F 16/248; G06F 3/04842; H04L 51/32; H04L 51/046
USPC ........................................................ 707/722
See application file for complete search history.

(56) References Cited

U.S. PATENT DOCUMENTS

| | | | | |
|---|---|---|---|---|
| 2005/0234883 A1* | 10/2005 | Szeto | ................ | G06F 17/30985 |
| 2006/0069664 A1* | 3/2006 | Ling | ................ | G06F 17/30979 |
| 2006/0294189 A1* | 12/2006 | Natarajan | ......... | G06F 17/30864 |
| | | | | 709/206 |
| 2008/0077558 A1* | 3/2008 | Lawrence | ......... | G06F 17/30867 |

(Continued)

FOREIGN PATENT DOCUMENTS

| | | |
|---|---|---|
| JP | 2005-044216 A | 2/2005 |
| KR | 10-2011-0068660 | 6/2011 |
| KR | 10-2014-0132630 | 11/2014 |

OTHER PUBLICATIONS

International Search Report and Written Opinion for WO Application No. PCT/US2015/064267, dated Mar. 23, 2016.

*Primary Examiner* — Evan Aspinwall
(74) *Attorney, Agent, or Firm* — Jefferson IP Law, LLP

(57) ABSTRACT

Techniques include receiving a user input (e.g., a text string), transmitting the input to a search system (e.g., as a search query), and receiving search results from the system in response to transmitting the input. The techniques further include determining whether the user input includes a message (e.g., using the user device, search system, or another system or device). The techniques include, when the user input includes a message, generating a messaging result that indicates a messaging software application (app) (e.g., which may or may not be installed on the user device), and displaying the search results and the messaging result at the device. The techniques also include, when the user input does not include a message, refraining from generating the messaging result, and displaying the search results at the user device without displaying the messaging result.

22 Claims, 12 Drawing Sheets

(56) References Cited

U.S. PATENT DOCUMENTS

| | | | |
|---|---|---|---|
| 2008/0200193 A1* | 8/2008 | Han | H04W 4/12 |
| | | | 455/466 |
| 2008/0201434 A1* | 8/2008 | Holmes | G06Q 10/10 |
| | | | 709/206 |
| 2008/0208812 A1* | 8/2008 | Quoc | G06Q 10/10 |
| 2008/0209309 A1* | 8/2008 | Zhang | G06F 17/30867 |
| | | | 715/205 |
| 2011/0225254 A1* | 9/2011 | Atkins | G06Q 10/107 |
| | | | 709/206 |
| 2012/0110009 A1* | 5/2012 | Kraft | G06F 17/30867 |
| | | | 707/769 |
| 2012/0179706 A1* | 7/2012 | Hobbs | G06F 9/44505 |
| | | | 707/769 |
| 2012/0284247 A1* | 11/2012 | Jiang | G06F 17/30867 |
| | | | 707/706 |
| 2012/0303477 A1 | 11/2012 | Ben-Itzhak | |
| 2013/0073661 A1* | 3/2013 | Chang | G06F 17/30637 |
| | | | 709/206 |
| 2016/0203498 A1* | 7/2016 | Das | G06Q 30/02 |
| | | | 705/7.29 |

\* cited by examiner

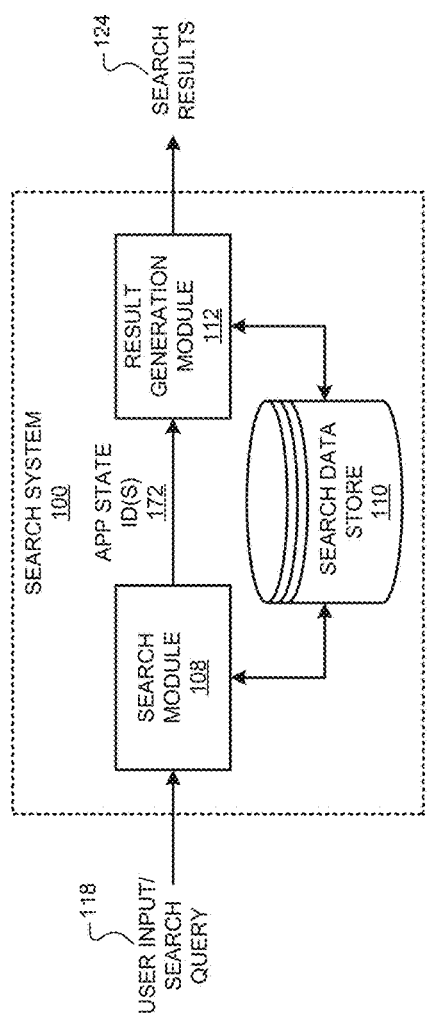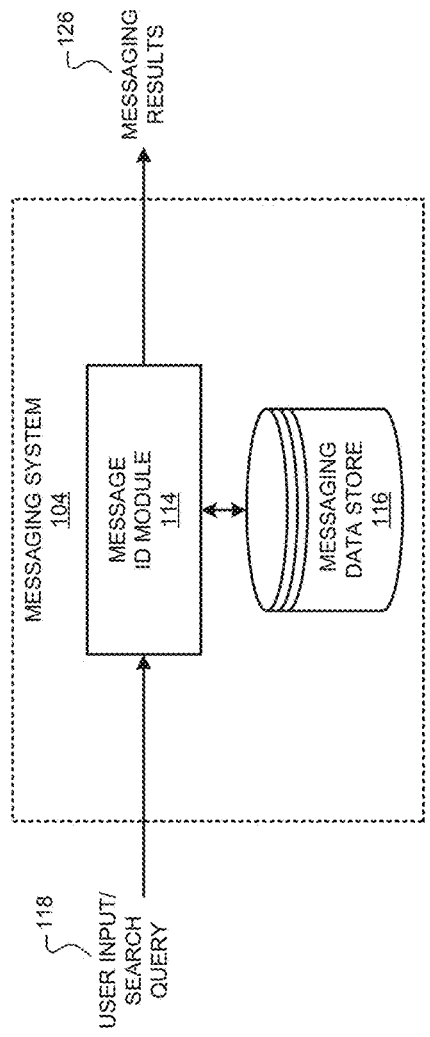

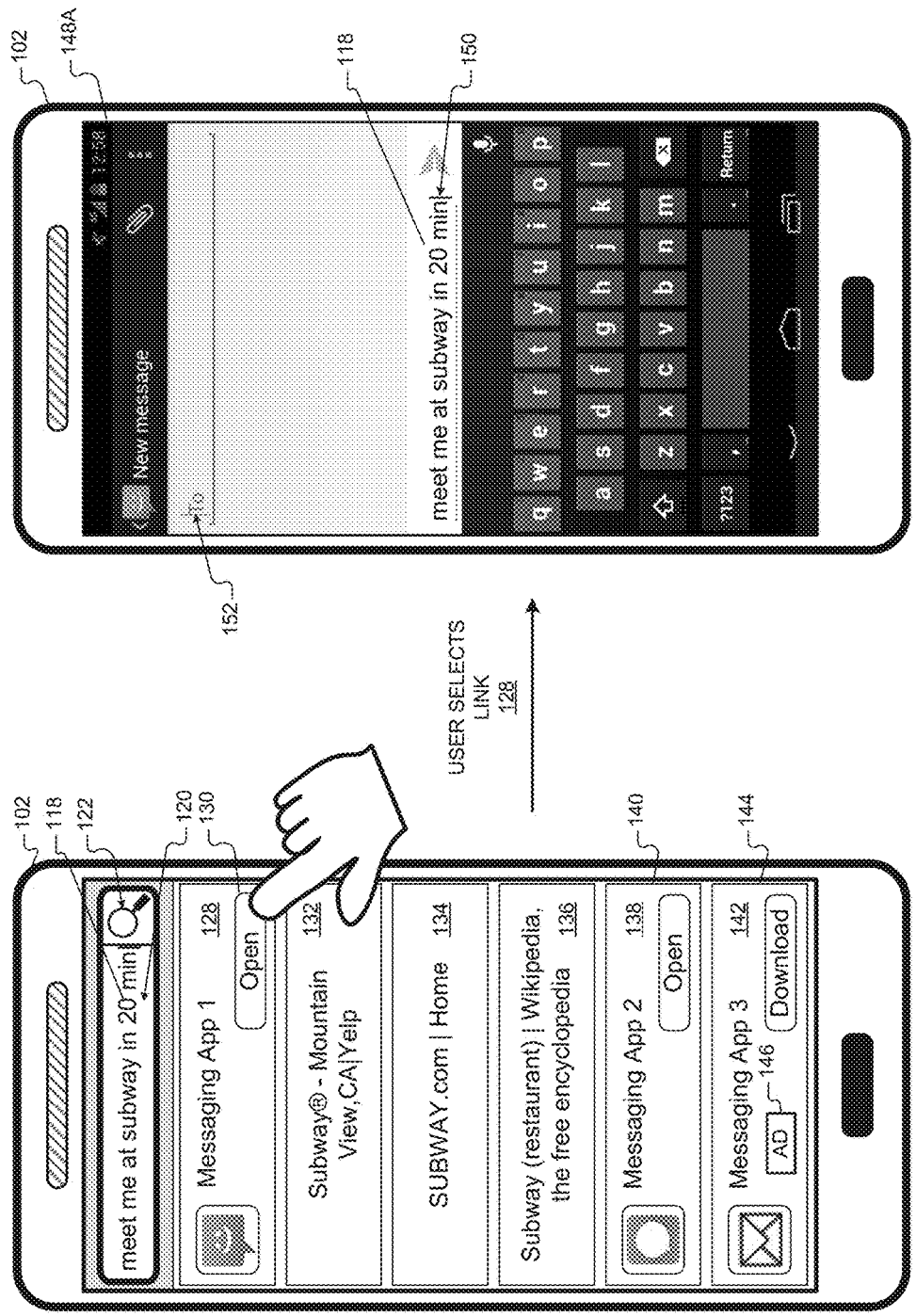

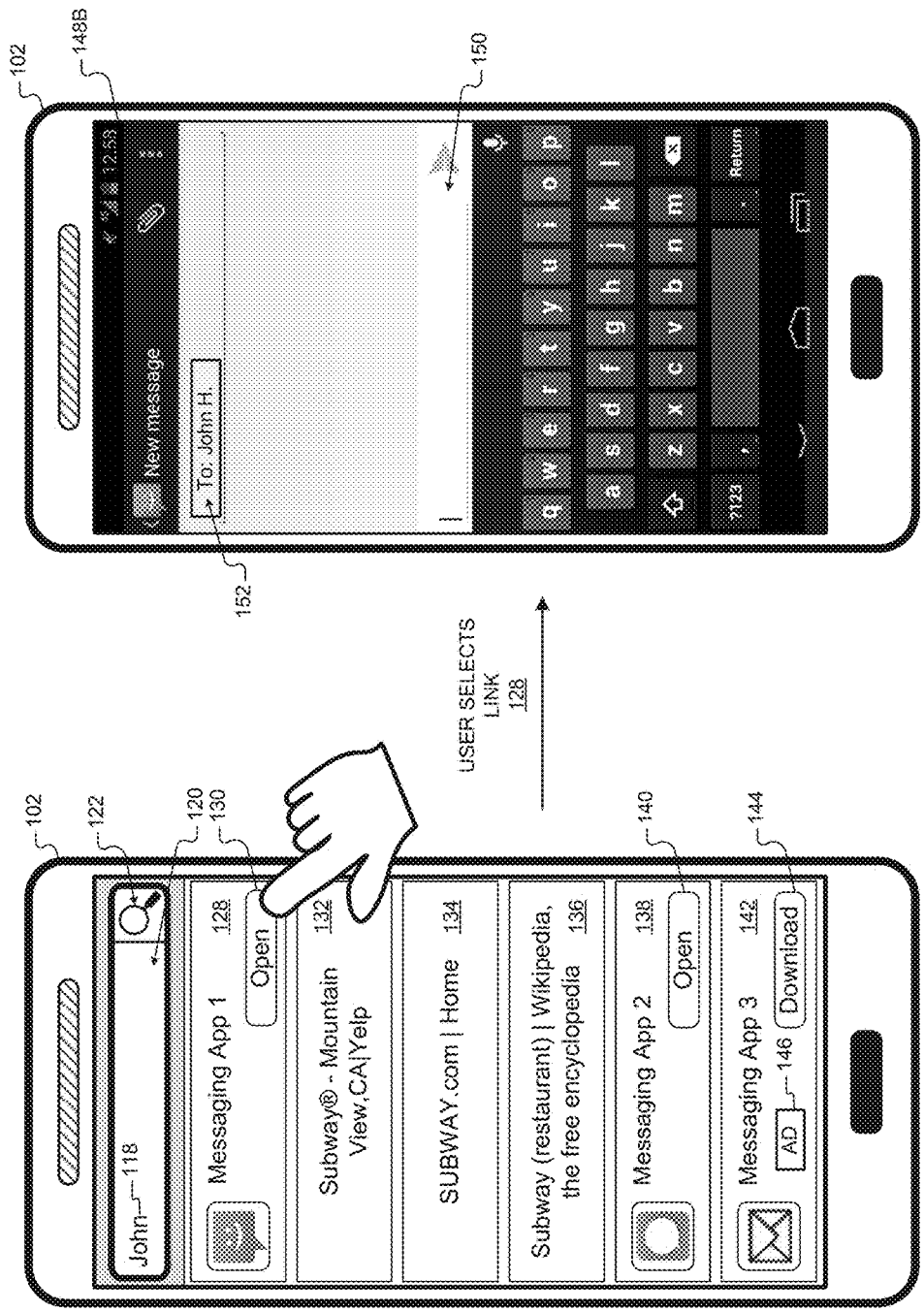

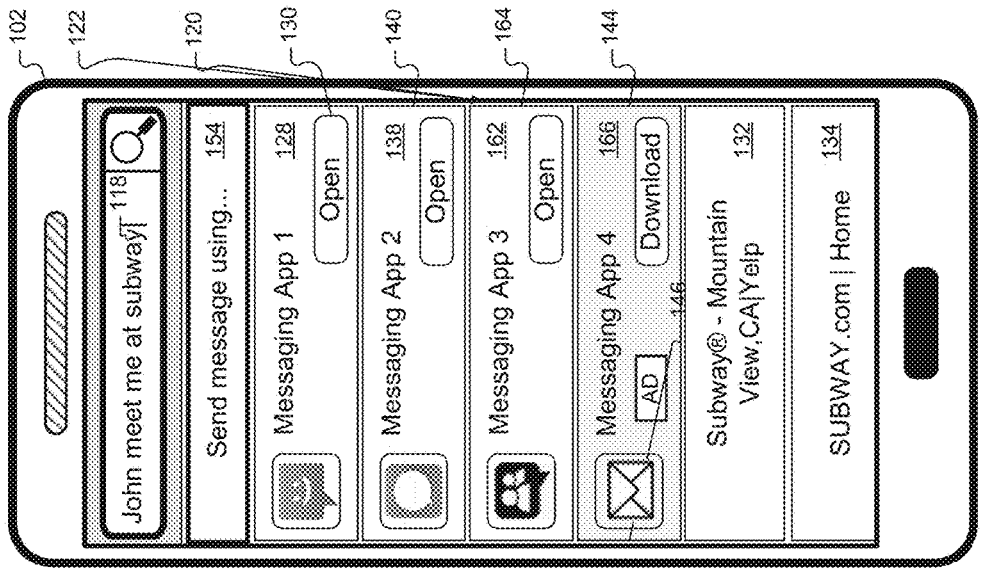
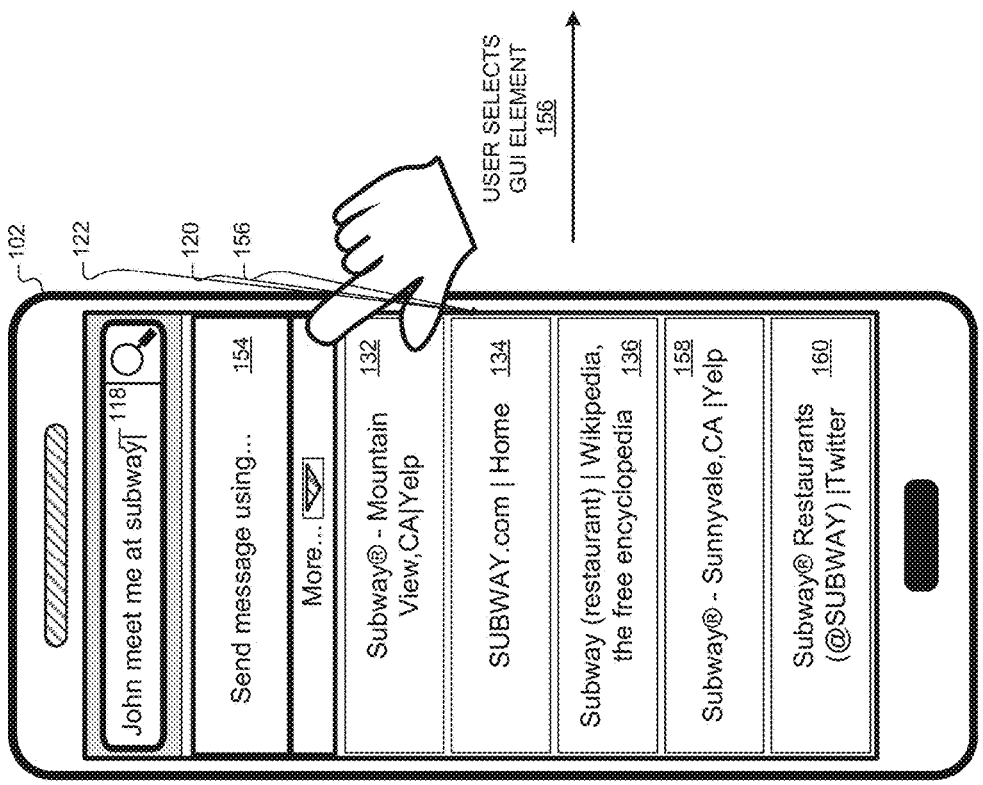

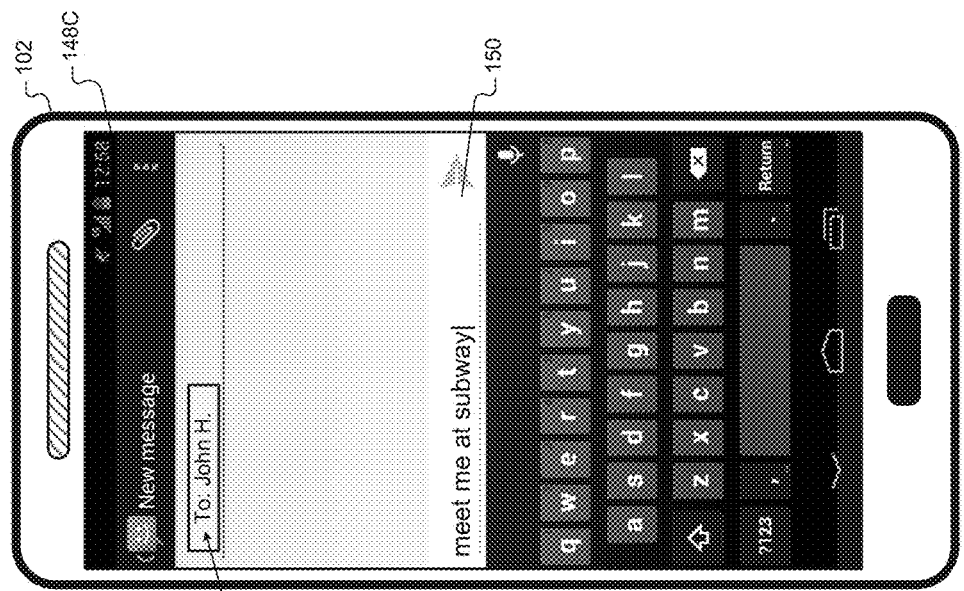
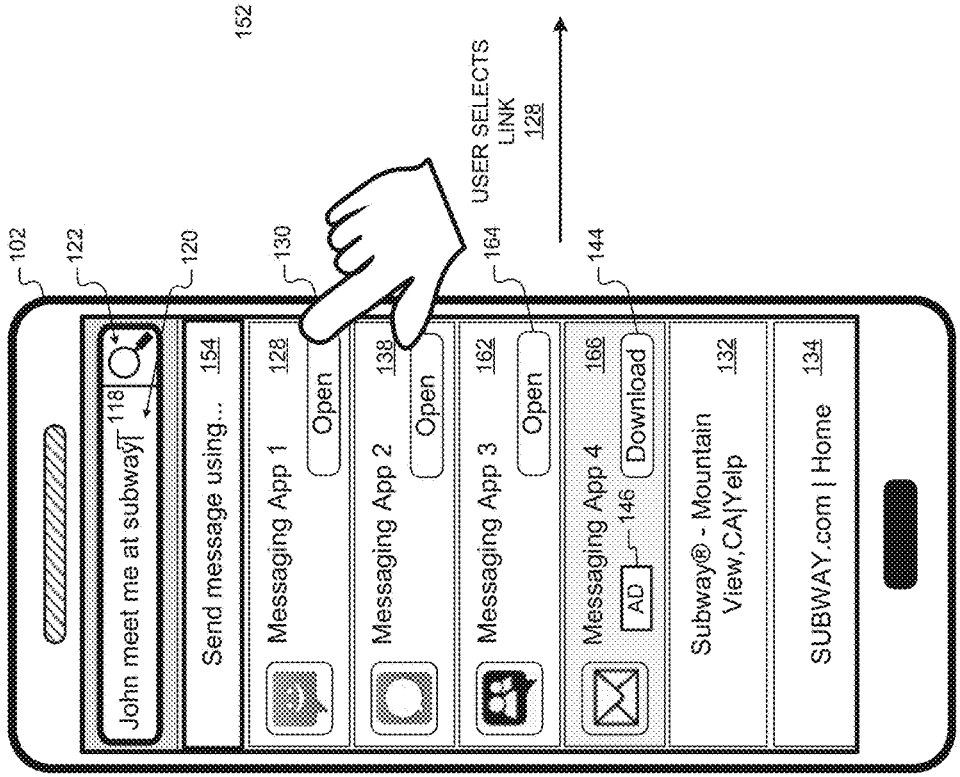
FIG. 6D
FIG. 6C

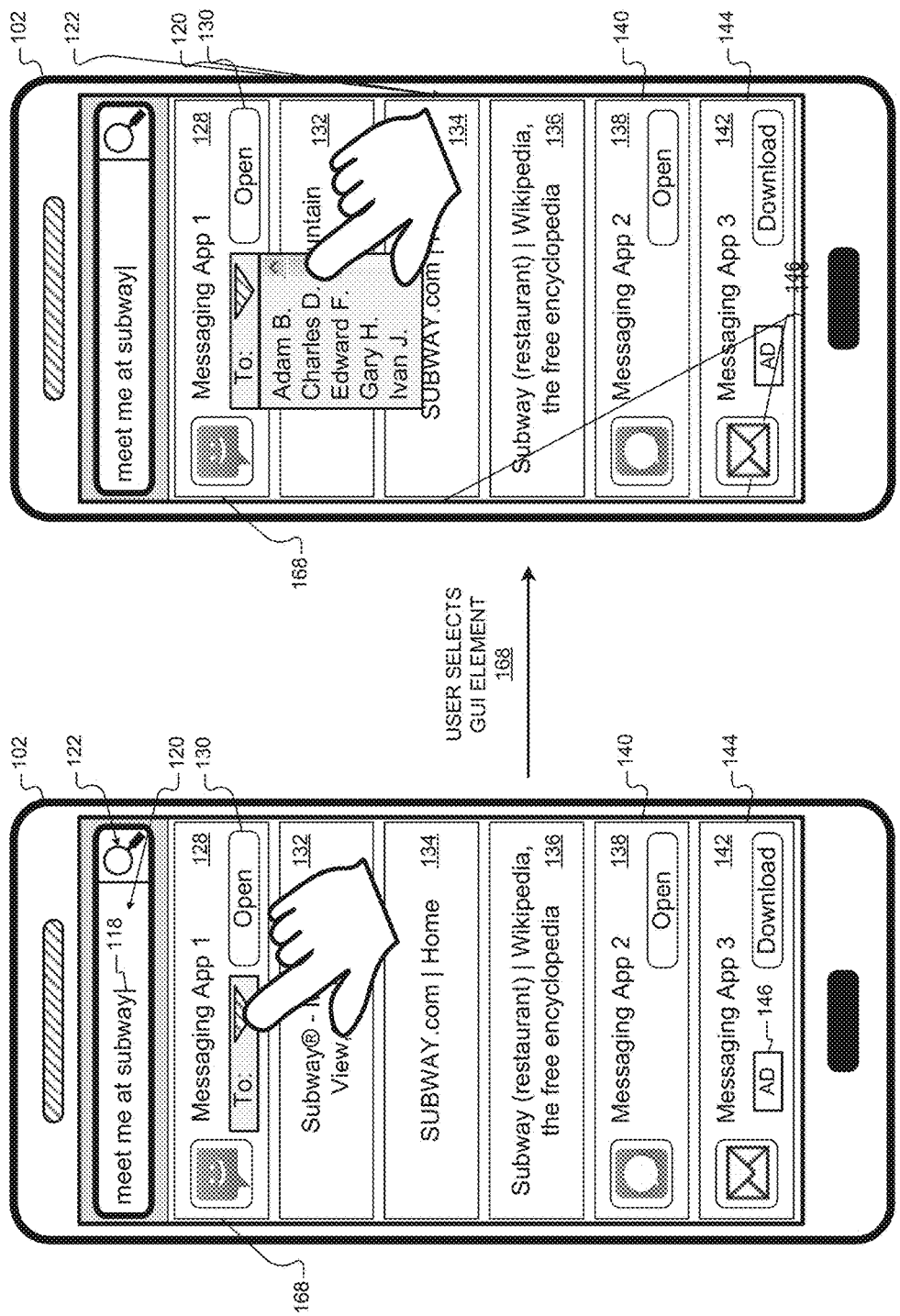

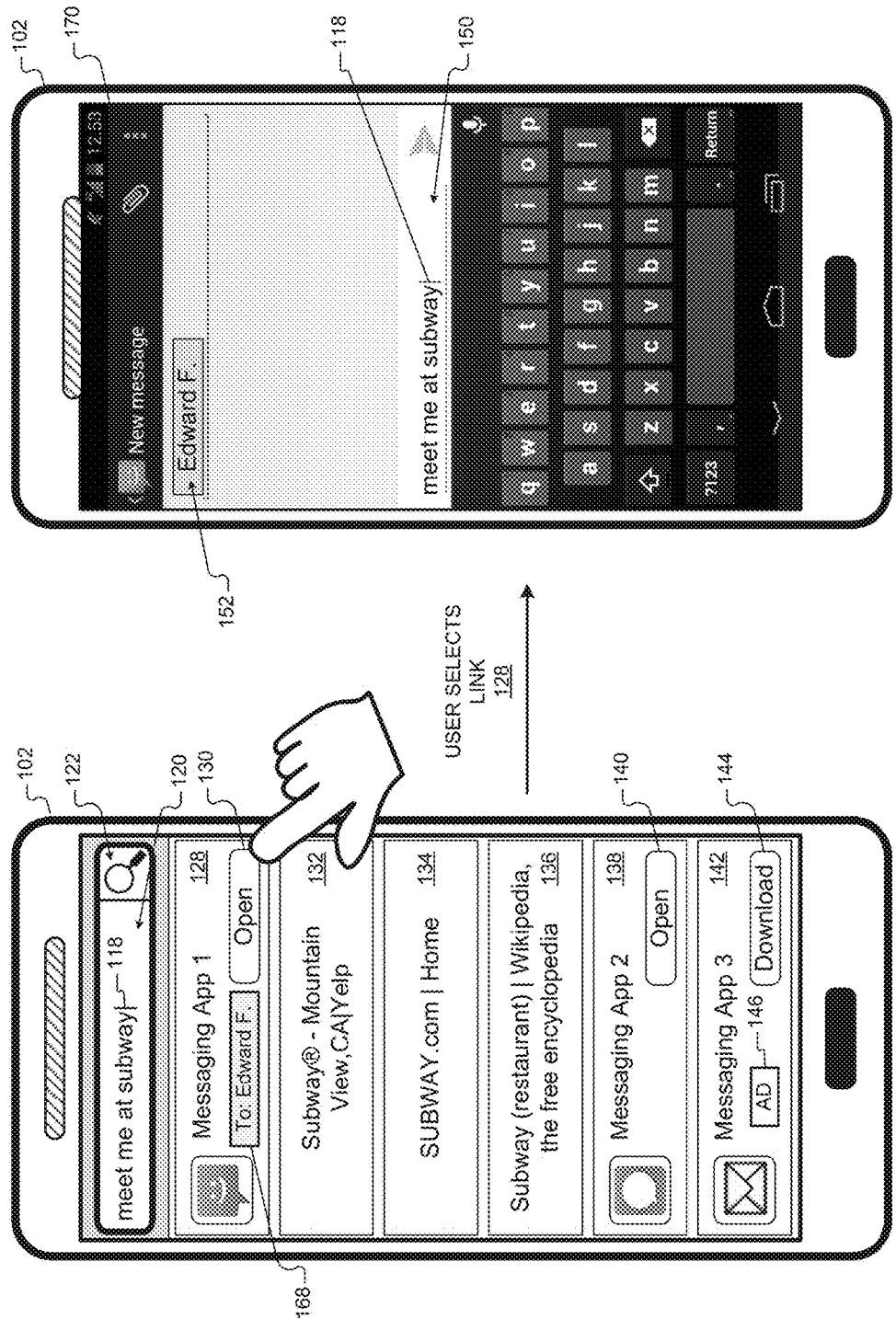

ACCESSING MESSAGING APPLICATIONS IN SEARCH

CROSS-REFERENCE TO RELATED APPLICATION

This U.S. patent application claims priority under 35 U.S.C. § 119(e) to U.S. Provisional Application 62/089,022, filed Dec. 8, 2014, which is hereby incorporated by reference in its entirety.

TECHNICAL FIELD

This disclosure generally relates to the fields of search and messaging, and more particularly to techniques for performing searches and accessing messaging applications.

BACKGROUND

In recent years, the use of computers, smartphones, and other Internet-connected computing devices has grown significantly. Correspondingly, the number of software applications (apps) available for such computing devices has also grown. Today, many diverse software apps can be accessed on a number of different computing devices, including smartphones, personal computers, automobiles, and televisions. These software apps include business driven apps, games, educational apps, news apps, shopping apps, messaging apps, media streaming apps, and social networking apps, as some examples. Using software apps, computing device users may perform various functions, including searching and messaging.

SUMMARY

In one example, a method includes receiving, at a user device, a user input, transmitting, using the user device, the user input to a search system, receiving, at the user device, search results from the search system in response to transmitting the user input, and determining, using the user device, whether the user input includes a message. The method further includes, when the user input includes a message, generating, using the user device, a messaging result that indicates a messaging application (app), and displaying the search results and the messaging result at the user device. The method also includes, when the user input does not include a message, refraining from generating the messaging result, and displaying the search results at the user device without displaying the messaging result.

In another example, a method includes receiving a search query from a user device, generating search results based on the search query, transmitting the search results to the user device, and determining whether the search query includes a message. The method further includes, when the search query includes a message, generating a messaging result that indicates a messaging app, and transmitting the search results and the messaging result to the user device. The method also includes, when the search query does not include a message, refraining from generating the messaging result, and transmitting the search results to the user device without transmitting the messaging result.

In another example, a system includes one or more computing devices configured to receive a user input, transmit the user input to a search system, receive search results from the search system in response to transmitting the user input, and determine whether the user input includes a message. The one or more computing devices are further configured to, when the user input includes a message, generate a messaging result that indicates a messaging app, and display the search results and the messaging result. The one or more computing devices are also configured to, when the user input does not include a message, refrain from generating the messaging result, and display the search results without displaying the messaging result.

In another example, a system includes one or more computing devices configured to receive a search query from a user device, generate search results based on the search query, transmit the search results to the user device, and determine whether the search query includes a message. The one or more computing devices are further configured to, when the search query includes a message, generate a messaging result that indicates a messaging app, and transmit the search results and the messaging result to the user device. The one or more computing devices are also configured to, when the search query does not include a message, refrain from generating the messaging result, and transmit the search results to the user device without transmitting the messaging result.

In another example, a non-transitory computer-readable storage medium includes instructions that cause one or more computing devices to receive a user input, transmit the user input to a search system, receive search results from the search system in response to transmitting the user input, and determine whether the user input includes a message. The instructions further cause the one or more computing devices to, when the user input includes a message, generate a messaging result that indicates a messaging app, and display the search results and the messaging result. The instructions also cause the one or more computing devices to, when the user input does not include a message, refrain from generating the messaging result, and display the search results without displaying the messaging result.

In another example, a non-transitory computer-readable storage medium includes instructions that cause one or more computing devices to receive a search query from a user device, generate search results based on the search query, transmit the search results to the user device, and determine whether the search query includes a message. The instructions further cause the one or more computing devices to, when the search query includes a message, generate a messaging result that indicates a messaging app, and transmit the search results and the messaging result to the user device. The instructions also cause the one or more computing devices to, when the search query does not include a message, refrain from generating the messaging result, and transmit the search results to the user device without transmitting the messaging result.

BRIEF DESCRIPTION OF DRAWINGS

The details of one or more examples are set forth in the accompanying drawings and the description below. Other features, objects, and advantages will be apparent from the description and drawings, and from the claims.

FIG. 4A is a functional block diagram of an example search system.

FIG. 4B is a functional block diagram of an example messaging system.

FIGS. 5A-8B depict example graphical user interfaces (GUIs) that may be generated and displayed on a user device according to the present disclosure.

DETAILED DESCRIPTION

Figure 1:
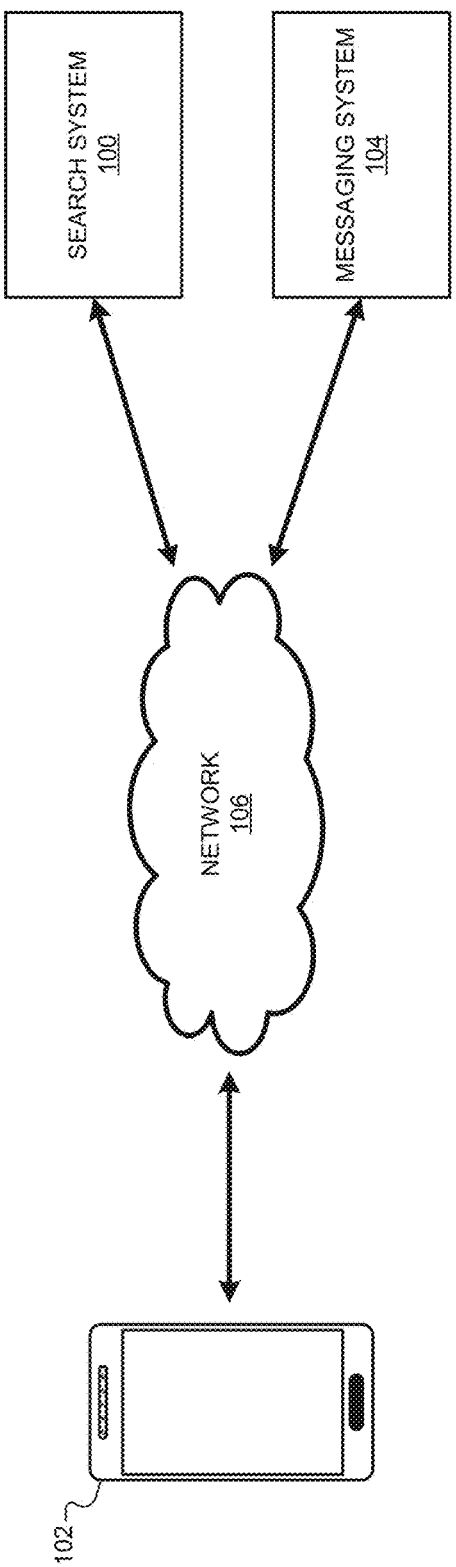
FIG. 1 depicts an example environment including a search system, a messaging system, and a user device that communicate via a network.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the fields of search and messaging, and, more particularly, to techniques for performing searches and sending messages using a common user interface. Specifically, the techniques disclosed herein are directed to a user device and a search system that enable users to invoke messaging software applications, or "apps" (e.g., text messaging, chat, or email apps) using search queries (e.g., text strings) configured to perform searches (e.g., using search engines) for search results (e.g., states of native or web-based apps, app download links, web pages, documents, images, songs, videos, podcasts, and other data).

According to the techniques of this disclosure, a user device (e.g., a mobile computing device, such as a smartphone, or a tablet) may receive a user input (e.g., a text string) from a user of the device. For example, the user may enter the user input into a search field, or a so-called "search bar," of a search app executing on the user device. The user device may then transmit the user input to a search system (e.g., as a search query) and receive search results from the system in response to transmitting the input. The user device may further determine whether the user input includes a message. In these examples, when the user input includes a message, the user device may generate a messaging result that indicates a messaging app (e.g., a text messaging, chat, or email app). The user device may then display the received search results and the messaging result at the device (e.g., as user selectable links). Alternatively, when the user input does not include a message, the user device may refrain from generating the messaging result. In these examples, the user device may display the received search results at the device (e.g., as one or more user selectable links) without displaying the messaging result.

Also according to the techniques disclosed herein, the search system may receive a search query (e.g., a text string) from the user device. As described herein, the search query may be a user input received by the user device from a user. The search system may then generate search results based on the search query and transmit the results to the user device. The search system may also determine whether the search query includes a message. In these examples, when the search query includes a message, the search system may generate a messaging result that indicates a messaging app (e.g., a text messaging, chat, or email app) and transmit the search results and the messaging result to the user device (e.g., to be displayed as user selectable links). Alternatively, when the search query does not include a message, the search system may refrain from generating the messaging result, and may instead transmit the search results to the user device without transmitting the messaging result.

In some examples, to determine whether the user input (e.g., the search query) includes a message, one or more of the user device and search system determines whether the input references a person's name (e.g., a name associated with contact information stored on the device, such as a name included in a so-called "contacts" list). In other examples, to make this determination, the user device and/or search system may determine whether the user input includes one or more of a messaging slang term (e.g., a messaging abbreviation term, such as "brb," "smh," "rofl," or "omg"), a messaging expression term (e.g., "haha"), an emoticon (e.g., "☺," ")," or "<3")"), and a punctuation character. In still other examples, to make this determination, the user device and/or search system may determine whether the user input includes one or more of a predetermined term (e.g., one or more characters), a predetermined phrase (e.g., one or more terms), a predetermined number of characters, a predetermined number of terms, and a predetermined usage of grammar.

In some examples, the user device generates and displays the messaging result such that the result indicates at least a portion (e.g., one or more characters) of a name of the messaging app indicated by the result. In other examples, the user device may generate and display the messaging result such that the result indicates whether the messaging app is installed on the device. In examples where the messaging app is installed on the user device, the device may generate and display the messaging result such that the result includes a graphical user interface (GUI) element that, upon being selected by a user, causes the device to launch the app. In examples where the messaging app is not installed on the user device, the device may generate and display the messaging result such that the result includes an app download address (ADA) (e.g., a URL) that specifies a location (e.g., a digital distribution platform) from which the app may be downloaded. In these examples, the user device may generate and display the messaging result such that the result also includes a GUI element that, upon being selected by a user, directs the device to the location using the ADA. The user may then cause the user device to download the messaging app from the location and install the app on the device. In these examples, the search system may transmit the ADA to the user device. Additionally, also in examples where the messaging app is not installed on the user device, the device may generate and display the messaging result such that the result includes a GUI element that indicates an advertisement (ad) associated with the app (e.g., includes an image and/or text that describe the ad). In these examples, the search system may transmit data that specifies the ad (e.g., the image and/or text that describe the ad) to the user device.

In some examples, the user device generates and displays the messaging result such that the result indicates at least a portion (e.g., one or more characters) of the message included in the user input. In other examples, in cases where the user input references a name associated with contact information stored on the user device (e.g., a name included in a contacts list), the device may generate and display the messaging result such that the result indicates at least a portion (e.g., one or more characters) of the name. In still other examples, the user device may generate and display the messaging result such that the result indicates that the result is different than the search results (e.g., using an image and/or text that distinguish the results).

In some examples, to generate and display the messaging result, the user device displays a GUI element that, upon being selected by a user, causes the device to display one or more (e.g., a list of) messaging results including the messaging result. In these examples, each of the messaging results may indicate a messaging app. To generate and display the messaging result, the user device may receive a selection of the GUI element by the user, and, in response to receiving the selection, display the messaging results including the result. In these examples, any of the messaging results may include one or more of the following: at least a portion (e.g., one or more characters) of a name of the corresponding messaging app; an indication of whether the app is installed on the user device; a GUI element that, upon being selected by a user, causes the device to launch the app; an ADA specifying a location at which the app can be downloaded; a GUI element that, upon being selected by a user, directs the device to the location using the ADA; a GUI element (e.g., an image and/or text) that indicates an ad associated with the app; at least a portion (e.g., one or more characters) of the message included in the user input; at least a portion (e.g., one or more characters) of a name referenced by the input and associated with contact information stored on the device e.g., a name included in a contacts list); and an indication (e.g., an image and/or text) that the result is different than the search results.

In some examples, the user device generates and displays the messaging result such that the result includes a GUI element that, upon being selected by a user, causes the device to display (e.g., in a so-called "drop-down menu") one or more names associated with contact information stored on the device (e.g., one or more names included in a contacts list). In these examples, upon the user selecting any of the names on the user device, the device may select the name as a recipient for the message included in the user input.

In examples where the messaging app indicated by the messaging result is installed on the user device, the device may receive a selection of the result by a user, and, in response to receiving the selection, launch the app on the device. In these examples, after launching the messaging app, the user device may further insert the message included in the user input into a message input field of the app configured to receive messages from users of the app. In examples where the user input references a name associated with contact information stored on the user device (e.g., a name included in a contacts list), the device may also, after launching the messaging app, insert the name into a recipient input field of the app configured to receive recipient names from users of the app.

In examples where the messaging app indicated by the messaging result is not installed on the user device and where the messaging result includes an ADA that specifies a location at which the app can be downloaded, the device may receive a selection of the result from a user, and, in response to receiving the selection, direct the device to the location using the ADA. In these examples, the user device may further download the messaging app from the location and install the app on the user device (e.g., at the direction of the user). Also in examples where the messaging app is not installed on the user device, the device may generate and display the messaging result such that the result includes a GUI element that indicates an ad associated with the app (e.g., an image and/or text that describe the ad). In these examples, the user device may receive a selection of the GUI element by a user, and, in response to receiving the selection, display the ad (e.g., display one or more terms and conditions thereof).

In this manner, the techniques of the present disclosure, in some examples, enables users of user devices to interact with messaging apps on the devices while performing searches using the devices. As a result, the users may be able to perform searches for search results and send messages via the messaging apps using a common user input (e.g., a text string) and a unified user interface (e.g., a search field of a search app included on the user device, thereby simplifying and enhancing the users' experience.

FIG. 1 is a functional block diagram that illustrates an example environment that includes a search system 100, a messaging system 104, and a user device 102 that communicate with one another via a network 106. The network 106 through which these systems and devices communicate may include any type of network, e.g., a local area network (LAN), a wide area network (WAN), and/or the Internet.

In the example of FIG. 1, the search system 100 receives a user input (e.g., a search query) from the user device 102 and generates one or more search results in response to receiving (e.g., based on) the user input/search query. The search system 100 then transmits the search results to the user device 102. Upon receiving the search results, the user device 102 displays the results to a user of the device 102 (e.g., as one or more user selectable links). In this example, the messaging system 104 also receives the user input/search query from the user device 102 (e.g., via the search system 100) and generates one or more messaging results in response to receiving (e.g., based on) the input/query. Specifically, the messaging system 104 determines whether the user input/search query includes a message. In the event the user input/search query includes a message, the messaging system 104 generates one or more messaging results that each indicate a messaging app (e.g., which may or may not be included on the user device 102). The messaging system 104 then transmits the messaging results to the user device 102 (e.g., via the search system 100). In examples where the messaging system 104 is included in the user device 102, the device 102 receives the messaging results directly from the system 104. In examples where the messaging system 104 is independent of the user device 102 (e.g., included in the search system 100, or is a stand-alone system), the system 104 transmits the messaging results to the device 102 via a communication interface (e.g., the network 106). In any case, upon receiving the messaging results from the messaging system 104, the user device 102 displays the messaging results to the user (e.g., as one or more user selectable links) along with the search results. Alternatively, when the user input/search query does not include a message, the messaging system 104 does not generate or transmit the messaging results.

As described herein, the search system 100 receives the user input/search query from the user device 102 and generates the search results in response to receiving (e.g., based on) the input/query. As also described herein, the messaging system 104 receives the user input/search query from the user device 102 (e.g., via the search system 100) and generates the messaging results in response to determining that the input/query includes a message. The user input/search query may include text, numbers, and/or symbols (e.g., punctuation) entered into the user device 102 by the user of the device 102. For example, the user may have entered the user input/search query into a search field, or box, of a search app included on the user device 102. The user may have entered the user input/search query using a touchscreen keypad, a mechanical keypad, and/or via speech recognition techniques. In some examples, the search app is a native app dedicated to search, or a more general app, such as a web browser app, as described herein.

In some examples, the user device 102 transmits additional data to the search system 100 and/or messaging system 104 along with the user input/search query. The user input/search query and the additional data may be referred to herein as a query wrapper. In some examples, the additional data is associated with the user input/search query and may include geo-location data for the user device 102, platform data for the device 102 (e.g., a type and/or a version of the device 102, an operating system (OS) of the device 102, and/or a web browser app included on the device 102), an identity of the user (e.g., a user name), partner specific data and other data. The user device 102 may transmit the query wrapper to the search system 100 and/or messaging system 104. The search system 100 may use the user input/search query and/or the additional data included in the query wrapper to generate the search results. The messaging system 104 may use the user input/search query and/or the additional data included in the query wrapper to generate the messaging results.

As described herein, the search system 100 receives the user input/search query from the user device 102 and generates the search results in response to receiving the input/query. For example, with reference to FIG. 2, the search system 100 may include a search module 108, a search data store 110 (hereinafter, the "data store 110"), and a result generation module 112. The search module 108 may receive the user input/search query from the user device 102 and identify one or more app state records included in the data store 110 using the input/query. Initially, the search module 108 may analyze the user input/search query. For example, the search module 108 may perform any of tokenization, filtering, stemming, synonymization, and stop word removal with respect to the user input/search query. The search module 108 may then identify the app state records included in the data store 110 based on the (e.g., analyzed) user input/search query. For example, the search module 108 may identify the app state records based on (e.g., text) matches between terms of the user input/search query and terms included in the identified records. The search module 108 may then process (e.g., score) the identified app state records. For example, the search module 108 may determine how well the app state records match the user input/search query. The search module 108 may than select one or more of the identified app state records that best match the user input/search query and transmit one or more app state identifiers (IDs) that indicate the selected records to the result generation module 112. The result generation module 112 may identify the app state records selected by the search module 108 in the data store 110 using the received app state iDs, generate the search results using the identified records, and transmit the search results to the user device 102.

In some examples, the search system 100 generates the search results such that the results specify one or more (e.g., "app") states of native or web-based apps. For example, upon identifying the app state records selected by the search module 108 in the data store 110 using the received app state IDs, the result generation module 112 may select one or more access mechanisms (AMs) from the identified records. An AM, as used herein, may refer to a string (e.g., one or more characters) that references a native or web-based app and indicates one or more operations for the app to perform.

Upon performing the operations, the app may be set into a particular state (e.g., where the app displays a GUI, or a so-called "screen," or a web page). Stated another way, an AM of this disclosure specifies a state of a native or web-based app. In some examples, the result generation module 112 transmits the selected AMs to the user device 102 as part of the search results. In other examples, the result generation module 112 may transmit the app state IDs that correspond to the app state records from which the AMs were selected to the user device 102 as part of the search results. In these examples, the user device 102 may access the app state records in the data store 110 using the received app state IDs and select the AMs from the records. In any case, the user device 102 may display the search results, including the AMs, to the user of the device 102 (e.g., as one or more user selectable links).

In this disclosure, an app may refer to computer software that causes a computing device (e.g., the user device 102) to perform a task. In some examples, an app is referred to as a "program." Example apps include word processing apps, spreadsheet apps, messaging apps, media streaming apps, social networking apps, and games. Apps can be executed on a variety of different computing devices, including mobile computing devices such as smartphones, tablets, and wearable computing devices (e.g., headsets and/or watches). Apps can also be executed on other types of computing devices having other form factors, such as laptop or desktop computers, or other consumer electronic devices. In some examples, apps are installed on a computing device prior to a user purchasing the device. In other examples, the user may download and install apps on the computing device after purchasing the device. In this disclosure, a native app may refer to an app that is used by first installing the app on a user device, and a web-based app may refer to an app that is accessible from a user device via a web browser app.

A single app may provide multiple different functionalities. For example, a restaurant reservation app may access reviews for a variety of different restaurants and set up reservations at the restaurants. Similarly, a travel app can book hotels, book flights, and provide reviews for different travel destinations. The different functionalities associated with a single app may be accessed using different AMs. For example, with respect to the restaurant reservation app, the data store 110 may include multiple app state records each having different AMs for accessing different restaurant reviews and setting up reservations. Similarly, with respect to the travel app, the data store 110 may include different app state records each having different AMs for booking hotels, booking flights, and accessing reviews for different travel destinations.

An AM, as described herein, may include one of a native app AM (hereinafter, "app AM," or "AAM") and a web AM (hereinafter, "WAM"). As such, the user device 102 may use an AM of the present disclosure to access functionality provided by (e.g., a state of) a native or a web-based app. For example, the user may select a user selectable link that includes the AM to access the functionality (e.g., the state) of the native or web-based app indicated by the link. An AAM may reference a native app and indicate one or more operations for the app to perform, as described herein. A WAM may include a resource identifier that references a web resource (e.g., a web page of a web-based app). For example, the WAM may include a uniform resource locator (URL) (e.g., a web address) used with the hypertext transfer protocol (HTTP). If the user selects a user selectable link that includes the WAM, the user device 102 may launch a web browser app included on the device 102 and retrieve the web resource indicated in the resource identifier. Stated another way, if the user selects the user selectable link, the user device 102 may launch the web browser app and access a state e.g., a web page) of a web-based app. In some examples, the WAM includes a URL for a mobile-optimized site and/or a full site.

In other examples, the search module 108, data store 110, and result generation module 112 may be configured to generate the search results such that the results specify information other than states of native or web-based apps. For example, the search module 108, data store 110, and result generation module 112 may generate the search results such that the results reference one or more web pages, documents, images, songs, videos, podcasts, as well as various other types of data (e.g., apps, such as download links for the apps). As described herein, upon receiving the search results from the search system 100 (e.g., from the result generation module 112), the user device 102 may display the results to the user.

The data store 110 may include one or more databases, indices (e.g., inverted indices), tables, files, or other data structures that may be used to implement the techniques of the present disclosure. In some examples, the data store 110 is included in one or more storage devices. As described herein, in some examples, the data store 110 includes one or more app state records each of which include data related to a state of a native or web-based app (e.g., an AM, such as an AAM or a WAM). In these examples, the search system 100 (e.g., the search module 108 and result generation module 112) may use the app state records included in the data store 110 to generate search results that specify states of native and/or web-based apps. Additionally, or alternatively, the data store 110 may include other data structures and information that enable the search system 100 (e.g., the search module 108 and result generation module 112) to generate search results that specify other content (e.g., web pages, documents, images, songs, videos, podcasts, and various other types of data), as also described herein.

In some examples, the search system 100 (e.g., the result generation module 112) transmits additional data to the user device 102 with the search results. As one example, the search module 108 may generate one or more result scores for the identified app state records (e.g., as part of processing the records). For example, the search module 108 may generate the result scores for the app state records using values of metrics associated with persons, places, and/or things described in the records. As a result, each identified app state record may be associated with a result score that indicates a rank of the record relative to the other identified records. As another example, for each of the search results, the search system 100 (e.g., the search module 108) may generate a ranking value indicating a rank of the result relative to the other results. The search system 100 may transmit the result scores or ranking values to the user device 102 with the search results (e.g., with one or more AMs and/or other information related to web pages, documents, images, songs, videos, podcasts, and other data). The user device 102 may use the result scores or ranking values to display one or more user selectable links generated for the search results by the device 102 (e.g., to order the links within a list).

In some examples, the search system 100 (e.g., the result generation module 112) transmits the search results to the user device 102 with link (e.g., text and/or image) data. In these examples, to display the search results to the user, the user device 102 may generate one or more user selectable links for the results using the link data and display the links on the device 102 (e.g., on a display of the device 102). Each user selectable link may be associated with one of the search results, such that when the user selects the link, the user device 102 accesses the result (e.g., sets a native or web-based app into a state, or accesses a web page, document, image, song, video, podcast, or other data). Each user selectable link may also include text and/or image data that is displayed to the user as part of the link. The text and/or image data may indicate to the user the action that the user device 102 performs in response to the user selecting the user selectable link. The text and/or image data may also describe the corresponding search result. In some examples, if the user selectable link is for a state of a native or web-based app, the text and/or image data indicates that the user device 102 will launch the app (e.g., directly, or via a web browser app), and that the app will be set into the state, when the user selects the link. The text and/or image data may also describe the state. In other examples, if the user selectable link is for a web page, document, image, song, video, podcast, or other data, the text and/or image data may indicate one or more of a name, a description, a web address (e.g., a URL), and at least a portion of the content of the web page, document, image, song, video, podcast, or other data.

As described above, upon receiving the search results from the search system 100, the user device 102 may render the results as one or more user selectable links and display the links to the user on the device 102 (e.g., on a display of the device 102). The user device 102 may then receive selections of one or more of the user selectable links from the user. In response to the user selecting a user selectable link for a search result that includes an AM (i.e., a search result that specifies a state of a native or web-based app), the user device 102 may launch a native or web-based app referenced by the AM and cause the app to perform one or more operations indicated by the AM to set the app into a particular state. For example, upon being set into the state, the app may be configured to display one or more products, services, or vendors, to the user. In response to the user selecting a user selectable link for a search result that does not specify a state of an app, the user device 102 may access a web page, document, image, song, video, podcast, or other data (e.g., via a web browser app included on the device 102).

As described herein, the messaging system 104 also receives the user input/search query from the user device 102 (e.g., via the search system 100) and determines whether the input/query includes a message. For example, the messaging system 104 may determine whether the user input/search query potentially includes a message (e.g., as indicated by one or more values representing an amount of certainty or degree of confidence that the input/query includes a message). In some examples, the messaging system 104 determines whether the user input/search query includes a message before or after the user has completed typing, or otherwise entering the input/query into the user device 102 (e.g., upon the user entering a portion, such as one or more characters, of the input/query into the device 102, or upon the user submitting the completed input/query to the device 102). In the event the user input/search query includes a message, the messaging system 104 generates one or more messaging results and transmits the results to the user device 102. Alternatively, when the user input/search query does not include a message, the messaging system 104 refrains from generating or transmitting the messaging results. For example, with reference to FIG. 2, a message identification (ID) module 114 included in the messaging system 104 may receive the user input/search query from the user device 102. The message ID module 114 may further determine whether the user input/search query includes a message based on whether the input/query includes one or more of a messaging slang term e.g., a messaging abbreviation term), a messaging expression term, an emoticon, a punctuation character, a predetermined term, a predetermined phrase, a predetermined number of characters, a predetermined number of terms, and a predetermined usage of grammar. The message ID module 114 may make this determination using data stored in a messaging data store 116 (hereinafter, the "data store 116") also included the messaging system 104, which is described in greater detail below. Upon determining that the user input/search query includes a message, the message ID module 114 generates one or more messaging results and transmits (e.g., via the search system 100) the results to the user device 102. As described herein, the user device 102 may display the messaging results to the user with the search results received by the device 102 from the search system 100 (e.g., as user selectable links). Alternatively, upon determining that the user input/search query does not include a message, the message ID module 114 refrains from generating or transmitting the messaging results. In these examples, the user device 102 may display the search results to the user without displaying the messaging results.

The data store 116 may include one or more databases, indices (e.g., inverted indices), tables, files, or other data structures that may be used to implement the techniques of the present disclosure. In some examples, the data store 116 is included in one or more storage devices. In general, the data store 116 includes data that enables the messaging system 104 to determine whether the user input/search query includes a message, as described above. For example, the data store 116 may include one or more look up tables (LUTs), or lists that include one or more names of persons (e.g., names associated with contact information stored on the user device 102), messaging slang terms (e.g., messaging abbreviation terms), expression terms, and/or emoticons. Additionally, or alternatively, the LUTs, or lists, included in the data store 116 may include one or more punctuation characters, terms, phrases, numbers of characters, numbers of terms, and/or usages of grammar.

In some examples, the message ID module 114 generates the messaging result such that the result includes an AM (e.g., an AAM in cases where the messaging app indicated by the result is a native app). The AM may reference the messaging app and indicate one or more operations for the app to perform, in a similar manner as described above. Upon a user of the user device 102 selecting the messaging result (e.g., a user selectable link for the result) that includes the AM on the device 102, the device 102 may launch the messaging app, insert a message into the app, and/or specify a recipient for the message within the app, using the AM. In these examples, the message ID module 114 may retrieve the AM, or generate the AM using one or more mapping rules for the messaging app that define how to launch the app, insert a message into the app, and/or specify a recipient for the message within the app.

In some examples, the messaging system 104 (e.g., the message ID module 114) transmits additional data to the user device 102 with the messaging results. As one example, for each messaging result, the message ID module 114 may generate a ranking value that indicates a rank of the result relative to the other results. Additionally, or alternatively, the ranking value associated with each messaging result may indicate a rank of the result relative to the search results received by the user device 102 from the search system 100.

In some examples, the message ID module 114 generates the ranking value for each messaging result using various considerations, such as, e.g., whether the result indicates a messaging app that is included (e.g., installed) on the user device 102, whether the app is a free or a paid app, and a user rating of the app. In other examples, the message ID module 114 may assign relatively higher ranking values for the messaging results upon determining that the user input/search query is more likely to include a message. In these examples, the message ID module 114 may assign relatively lower ranking values for the messaging results upon determining that the user input/search query is less likely to include a message. In any case, the messaging system 104 may transmit the ranking values to the user device 102 with the messaging results. The user device 102 may use the ranking values to display the user selectable links generated for the messaging results with the user selectable links generated for the search results (e.g., to order the links generated for the search results and the messaging results within a list). In some examples, the user device 102 displays the user selectable links generated for the messaging results such that the links are grouped (e.g., separated from the user selectable links generated for the search results).

In some examples, the messaging system 104 (e.g., the message ID module 114) transmits the messaging results to the user device 102 with link (e.g., text and/or image) data, in a similar manner as described above with reference to the search results. In these examples, to display the messaging results to the user, the user device 102 may generate one or more user selectable links for the results using the link data and display the links on the device 102 (e.g., on a display of the device 102). Each user selectable link may be associated with one of the messaging results and indicate a messaging app, such that when the user selects the link, the user device 102 launches the app (e.g., after downloading and installing the app). In some examples, upon the user selecting the link, the user device 102 also inserts one or more of the message included in the user input/search query and a name of a recipient for the message into the messaging app. Each user selectable link may include text and/or image data displayed to the user as part of the link. The text and/or image data may indicate to the user the action the user device 102 performs in response to the user selecting the user selectable link (e.g., whether the device 102 may download and install the messaging app indicated by the link, and/or whether the device 102 may insert the message and/or the name of the recipient into the app). The text and/or image data may also describe the messaging app, the message, and/or the name of the recipient (e.g., a name of the app, at least a portion of the message, and/or at least a portion of the name).

In some examples, the search system 100, messaging system 104, and/or another system or device (e.g., an ad system) transmits ad (e.g., text and/or image) data to the user device 102 (e.g., with the search results and/or messaging results, or separately from the results). The user device 102 may use the ad data to generate one or more of the user selectable links described above (e.g., a link for one of the search or messaging results). For example, the ad data may indicate one or more terms or conditions of an ad associated with the corresponding user selectable link (e.g., with the corresponding search or messaging result), such as a monetary discount or credit related to a product or service specified by the link. In some examples, the ad data is generated (e.g., by an ad system) for one or more of the messaging results (e.g., for one or more corresponding messaging apps) upon the messaging system 104 determining that the user input/search query includes a message (e.g., upon the system 104 generating the results and/or transmitting the results to the user device 102). In these examples, the ad data may be generated for a particular messaging result (e.g., for a particular messaging app) in response to the search system 100, messaging system 104, and/or another system or device determining that the messaging app indicated by the result is not included (e.g., installed) on the user device 102. In this manner, the ad data generated for and included in the messaging result for the messaging app may cause the user to download and install the app using the user device 102.

The user device 102 may be any computing device capable of receiving user inputs from users, providing search queries (e.g., the user inputs) to the search system 100 and messaging system 104, and receiving search results and messaging results from the search system 100 and messaging system 104. The user device 102 may include any of smartphones and tablet, laptop, or desktop computers. The user device 102 may also include computing devices having other form factors, e.g., those included in vehicles, gaming devices, televisions, or other appliances (e.g., networked home automation devices and home appliances).

The user device 102 may use a variety of different operating systems or platforms. In an example where the user device 102 is a mobile device, the device 102 may operate using an OS, such as ANDROID® by Google, Inc., IOS® by Apple, Inc., or WINDOWS PHONE® by Microsoft Corporation. In an example where the user device 102 is a laptop or desktop computing device, the device 102 may use an OS, such as MICROSOFT WINDOWS® by Microsoft Corporation, MAC OS® by Apple, Inc., or LINUX® (LINUX® is the registered trademark of Linus Torvalds in the U.S. and other countries). The user device 102 may interact with the search system 100 and/or messaging system 104 using operating systems other than those described herein, whether presently available or developed in the future.

The user device 102 can communicate with the search system 100 and messaging system 104 via the network 106. In general, the user device 102 may communicate with any of the systems 100, 104 using any app that can receive user inputs from users, transmit search queries (e.g., the user inputs) to the systems 100, 104, and receive search results and messaging results from the systems 100, 104. In some examples, the user device 102 includes an app that is dedicated to interfacing with one or more of the systems 100, 104, such as an app dedicated to search (e.g., a search app). In other examples, the user device 102 may communicate with any of the systems 100, 104 using a more general app, such as a web browser app. In any case, an app included on the user device 102 to communicate with one or more of the systems 100, 104 may include a GUI with a search field, or box, into which users of the device 102 may enter user inputs/search queries, e.g., using a touchscreen, a physical keyboard, a speech-to-text program, or other form of user input available on the device 102.

The user device 102 may use a GUI of a search app, or a more general app, included on the device 102 to display the search results and messaging results to the user. The user device 102 may also use the GUI to receive user inputs from the user and transmit the inputs (e.g., as search queries) to the search system 100 and messaging system 104. The GUI may display the search results and messaging results to the user in a variety of different ways, depending on the information transmitted to the user device 102 from the systems 100, 104. In some examples, the systems 100, 104 transmit the search results and messaging results to the user device 102 with link data and/or ad data used by the device 102 to generate user selectable links for the results. In these examples, the GUI may display the search results and messaging results to the user as a list of the user selectable links, including text and/or image data. The text and/or image data may describe the search results and the one or more messaging apps indicated by the messaging results. In some examples, the GUI displays the search results and messaging results as the list of the user selectable links arranged under a search field into which a user has entered a user input/search query. The GUI may arrange the user selectable links by result scores or ranking values associated with the links, e.g., with the search results and messaging results corresponding to the links, or using other logic. The GUI may also group the user selectable links by topic or category (e.g., by the associated native or web-based app).

The search system 100 and messaging system 104 may use various data sources (not shown) to generate and/or update the data store 110 and data store 116, respectively. For example, the systems 100, 104 may use the data sources to generate and/or update one or more databases, indices, tables, files, or other data structures included in the data stores 110, 116. The search system 100 may generate new app state records and update existing app state records, or generate and update other data structures used to generate search results, based on data retrieved from the data sources. The search system 100 may include modules that generate new app state records and/or update existing app state records, or other data structures, based on the data retrieved from the data sources. The messaging system 104 may generate new LUTs or lists, and update existing LUTs or lists, or generate and update other data structures used to generate messaging results, based on data retrieved from the data sources. In some examples, some or all of the data included in any of the data stores 110, 116 (e.g., one or more app state records, LUTs, lists, or other data structures) are manually generated by a human operator.

The data sources described above may include a variety of different data providers. For example, the data sources may include data from app developers, such as app developer websites and data feeds provided by app developers. The data sources may also include operators of digital distribution platforms configured to distribute apps to user devices (e.g., the user device 102). The data sources may further include other websites, such as websites that include web logs (i.e., blogs), app reviews, or other data related to apps. Additionally, the data sources may include social networking sites, such as "FACEBOOK®" by Facebook, Inc. (e.g., Facebook posts) and "TWITTER®" by Twitter, Inc. (e.g., text from tweets). The data sources may also include online databases that include data related to movies, television programs, music, and restaurants. The data sources may include other types of data sources, which may have various types of content and update rates.

In some examples, the search system 100 and/or messaging system 104 retrieves data from the data sources. The search system 100 may generate one or more app state records, or other data structures, stored in the data store 110 based on the data. The messaging system 104 may generate one or more LUTs, lists, or other data structures, stored in the data store 116 based on the data. In other examples, some or all of the data included in the app state records, LUTs, lists, or other data structures, may be manually generated by a human operator. The data included in the app state records, LUTs, lists, or other data structures, may also be updated over time so that the systems 100, 104 provide up-to-date search results and messaging results.

Figure 2:
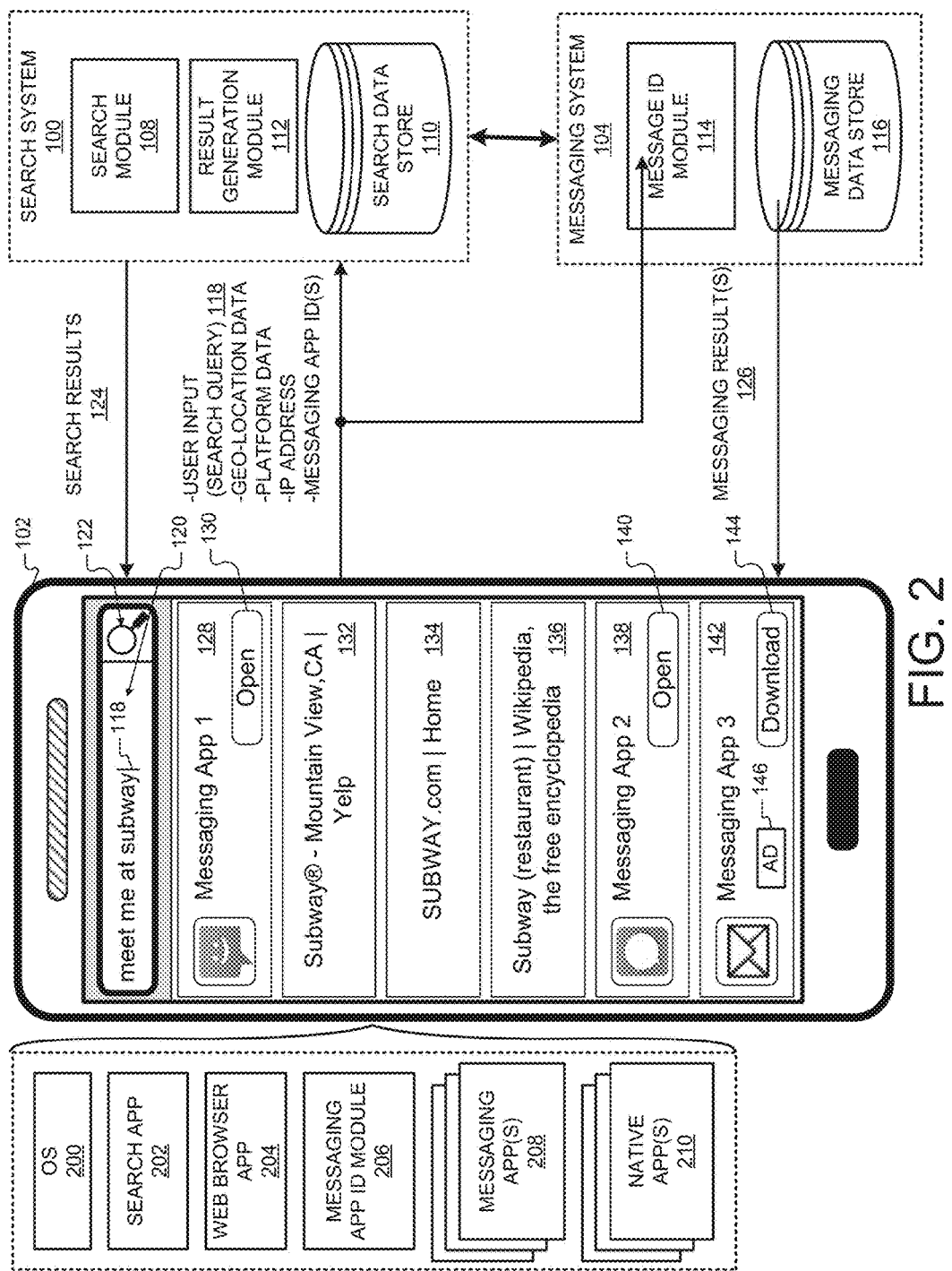
FIG. 2 depicts an example user device in communication with an example search system and an example messaging system according to the techniques of this disclosure.

FIG. 2 illustrates an example user device 102 in communication with an example search system 100 and an example messaging system 104. In the example of FIG. 2, the user device 102 transmits a user input (e.g., a search query) 118 ("meet me at subway") to each of the search system 100 and messaging system 104. In some examples, the user device 102 transmits the user input/search query 118 to the messaging system 104 via the search system 100. The user device 102 receives one or more search results 124 from the search system 100 in response to transmitting the user input/search query 118 to the system 100. The user device 102 also receives one or more messaging results 126 from the messaging system 104 (e.g., via the search system 100) in response to transmitting the user input/search query 118 to the system 104.

In the example of FIG. 2, the user device 102 transmits the user input/search query 118 to the search system 100 and/or messaging system 104 as part of a query wrapper. The query wrapper may include the user input/search query 118, geo-location data, platform data, and/or other data (e.g., an IP address) associated with the user, the user device 102, and/or the user input/search query 118. In some examples, the query wrapper includes one or more messaging app identifiers (IDs) (e.g., generated using a messaging app identification (ID) module 206 included on the user device 102) that indicate one or more messaging apps 208 included on the device 102. As shown in FIG. 2, the user may have entered the user input/search query 118 into a search field 120 of a GUI of a search app 202 included on the user device 102. The user may have caused the user device 102 to transmit the user input/search query 118 to the search system 100 and/or messaging system 104 by selecting (e.g., clicking on, or tapping) a search button 122 of the GUI. In response to receiving the query wrapper including the user input/search query 118 from the user device 102, the search system 100 generates the search results 124 and transmits the results 124 to the device 102. As described herein, in some examples, to generate the search results 124, the search system 100 identifies one or more app state records included in the data store 110 based on the user input/search query 118, select one or more app state IDs from the identified records, and generate the search results 124 using the selected ID(s). In these examples, the search results 124 may specify one or more states in one or more native or web-based apps. Additionally, or alternatively, the search system 100 may generate the search results 124 to include other types of information (e.g., that unrelated to states of native or web-based apps), as also described herein.

In response to receiving the user input/search query 118 (e.g., as part of the query wrapper) from the user device 102 (e.g., via the search system 100), the messaging system 104 generates the messaging results 126 and transmits the results 126 to the device 102. To generate the messaging results 126, the messaging system 104 may determine whether the user input/search query 118 includes a message, and, when the input/query 118 includes a message, generate the results 126. As described herein, the messaging results 126 may each indicate either one of the messaging app(s) 208 included on the user device 102, or a messaging app that is not included on the device 102. For example, one or more of the messaging results 126 may each indicate a different one of the messaging app(s) 208. As also described herein, in some examples, the messaging system 104 is included in (e.g., integrated with) one of the user device 102 and the search system 100. In examples where the messaging system 104 is part of the user device 102, the system 104 may identify the messaging app(s) 208 and generate the messaging results 126 such that one or more of the results 126 each indicates one of the app(s) 208. In examples where the messaging system 104 is independent of the user device 102, the system 104 may use the messaging app ID(s) received from the device 102 as part of the query wrapper to generate the messaging results 126 such that one or more of the results 126 each indicates one of the messaging app(s) 208. In the examples described above, the messaging system 104 may also generate the messaging results 126 such that one or more of the results 126 each indicates a messaging app that is not included on the user device 102 (e.g., a popular or new messaging app, or a messaging app specified by the user or other users).

As shown in FIG. 2, the user device 102 displays the search results 124 and messaging results 126 on the device 102 (e.g., on a display of the device 102) in the form of user selectable links 128,132, 134, 136, 138, and 142 (collectively, the "links"). Each link includes link data, e.g., text (e.g., a name of an app, such as a messaging app, a state of an app, a web page, or a web page entry) and an image (e.g., an icon for an app, such as a messaging app, a state of an app, a web page, or a web page entry) that describe the corresponding one of the search results 124 and messaging results 126 that is associated with the link. Specifically, in the example of FIG. 2, the user device 102 has generated the links 132, 134, and 136 based on the search results 124. As shown in FIG. 2, the links 132-136 and the search results 124 used to generate the links 132-136 relate to native app states, web resources, and other information associated with "Subway®" restaurants by Doctor's Associates, Inc. (e.g., as a result of the inclusion of the term "subway" in the user input/search query 118). Specifically, the link 132 describes an entry for a particular "Subway®" restaurant located in Mountain View, Calif. In the native app "YELP®" by Yelp, Inc. (hereinafter, "Yelp"). The link 134 describes a home web page ("Subway.com") associated with "Subway®" restaurants. The link 136 describes an entry for "Subway®" restaurants in the web-based encyclopedia "Wikipedia®" by Wikipedia Inc.

In the example of FIG. 2, the user device 102 has generated the links 128, 138, and 142 based on the messaging results 126. As shown in FIG. 2, the links 128, 138, and 142 each indicate a messaging app. In this example, the links 128 and 138 each indicate one of the messaging app(s) 208 that are included on the user device 102 (i.e., "Messaging App 1" and "Messaging App 2"). As also shown, the links 128, 138 include GUI elements 130 and 140 (i.e., each including the string "Open"), respectively that each prompt the user to select the corresponding one of the links 128, 138. Upon the user selecting any of the links 128, 138 (e.g., by touching, or clicking on the GUI elements 130, 140), the user device 102 may launch the messaging app 208 indicated by the selected link on the device 102, as described in greater detail below. Also in this example, the link 142 indicates a messaging app that is not included on the user device 102 (i.e., "Messaging App 3"). As further shown, the link 142 includes a GUI element 144 (i.e., including the string "Download") that prompts the user to select the element 144 to download the messaging app indicated by the link 142 on the user device 102. Upon the user selecting the GUI element 144, the user device 102 may access a location (e.g., a digital distribution platform) at which the messaging app can be downloaded using an ADA included in the link 142. The user device 102 may then install the messaging app on the device 102. As shown in FIG. 2, the link 142 also includes a GUI element 146 (i.e., including the string "AD") that indicates an ad associated with the link 142 (e.g., with Messaging App 3). In some examples, one or more of the links 128, 138, and 142 each indicate one of the messaging app(s) 208 or a messaging app that is not included on the user device 102.

In the example of FIG. 2, the search system 100 transmits the search results 124 for the links 132-136 to the user device 102 with link (e.g., text and/or image) data, such that the device 102 may generate and display the links 132-136. Similarly, the messaging system 104 transmits the messaging results 126 for the links 128, 138, and 142 to the user device 102 with link data, such that the device 102 may generate and display the links 128, 138, and 142. In some examples, the search system 100 and/or messaging system 104 transmits the search results 124 and/or messaging results 126 to the user device 102 with ranking data (e.g., result scores, ranking values, or values of other ranking metrics), such that the device 102 may arrange the links 128, 132-136, 138, and 142 for display to the user on the device 102 (e.g., as a list).

In this example, the user of the user device 102 may select one or more of the links 128, 132-136, 138, and 142. Each of the links 128, 132-136, 138, and 142 may be associated with data, such that when the user selects the link, the user device 102 accesses the one of the search results 124 and messaging results 126 that corresponds to the link. For example, the data may include one or more AMs that each reference a native or web-based app and indicate one or more operations for the app to perform, one or more URLs, and other information. The search system 100 and messaging system 104 may transmit the data to the user device 102 with the search results 124 and messaging results 126, respectively. In some examples, upon the user selecting any of the links 128, 138, and 142 (i.e., those corresponding to the messaging results 126), the user device 102 launches one of the messaging app(s) 208, or download, install, and launch another messaging app not included on the device 102. In these examples, the user device 102 may further insert the message included in the user input/search query 118 into the launched messaging app. Also in these examples, the user device 102 may specify a recipient for the message within the launched messaging app based on the user input/search query 118 (e.g., in cases where the input/query 118 specifies a name of the recipient). Alternatively, the user may specify the recipient for the message. In other examples, upon the user selecting any of the links 132-136 (i.e., those corresponding to the search results 124), the user device 102 may launch one of one or more native apps 210 included on the device 102 and set the launched native app 210 into a state specified by the selected one of the links 132-136. Alternatively, the user device 102 may launch a web browser app 204 included on the device 102 and access a web resource specified by the selected link (e.g., via a URL) via the app 204, in this manner, the user device 102 may set a web-based app into a state specified by the selected link. In the examples described above, the selected link may include an AM that references the native app 210 or web-based app and indicates one or more operations for the app to perform. In still other examples, the user device 102 may access another type of resource or information (e.g., a document, image, song, video, podcast, or other content) using data (e.g., a URL) included in the selected link.

As shown in FIG. 2, the user device 102 includes an OS 200, the search app 202, the web browser app 204, the messaging app ID module 206, the messaging app(s) 208, and the native app(s) 210. The OS 200 may be software configured to enable the user device 102 to perform the operations and functions attributed to the device 102 herein. The search app 202 may be a native or web-based app configured to receive user inputs/search queries 118 from users of the user device 102 and communicate with the search system 100 to receive search results 124 that are responsive to the inputs/queries 118, as described herein. The search app 202 may be further configured to communicate with the messaging system 104 (e.g., via the search system 100) to receive messaging results 126, as also described herein. The web browser app 204 may be a native app configured to enable the user device 102 to access web resources (e.g., via URLs, or other web addresses or resource identifiers). The messaging app ID module 206 may be software configured to determine the messaging app(s) 208 and/or generate the messaging app ID(s) that indicate the app(s) 208, as described herein. The messaging app(s) 208 may be one or more native or web-based apps configured to receive user inputs and transmit and receive messages (e.g., text messages, chat messages, and/or emails) between users and recipients. The native app(s) 210 may be any one or more native apps, including one or more messaging apps that are included on the user device 102.

Figure 3:
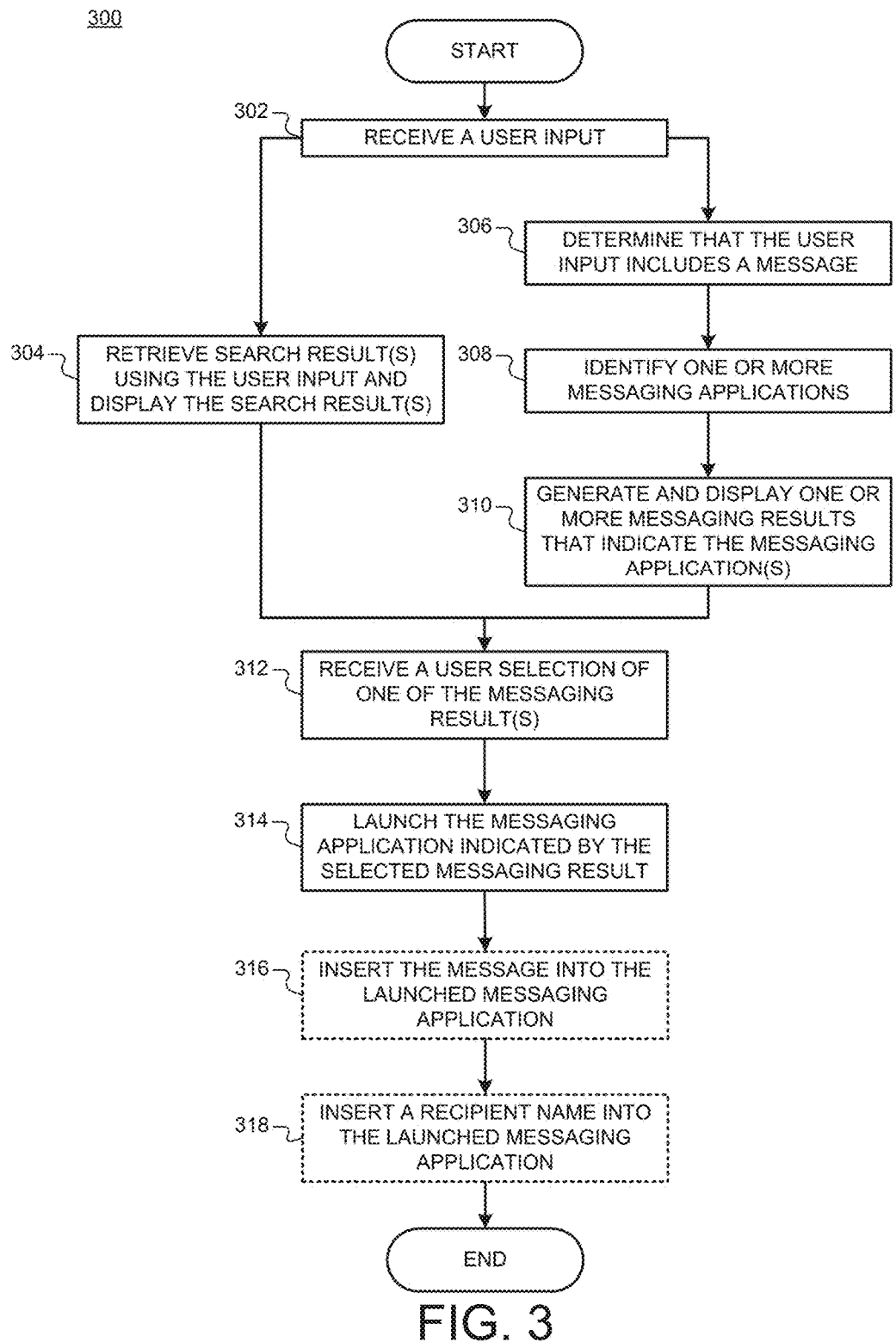
FIG. 3 a flow diagram that illustrates an example method for generating and displaying search results and messaging results in response to receiving a user input.

FIG. 3 illustrates an example method 300 for receiving a user input 118, generating search results 124 based on the input 118, determining whether the input 118 includes a message, and, when the input 118 includes a message, generating one or more messaging results 126 that each indicate a messaging app. In block 302, the user device 102 receives a user input (e.g., a search query) 118 from a user of the device 102. For example, the user may have entered the user input/search query 118 into a search field 120 of a search app 202 executing on the user device 102. In this example, the user device 102 transmits the user input/search query 118 to the search system 100 and the system 100 receives the input/query 118 from the device 102.

In block 304, the user device 102 retrieves one or more search results 124 using the user input/search query 118 and displays the results 124 to the user. In this example, the search system 100 (e.g., the search module 108) may identify one or more app state records (e.g., included in the data store 110) that each specify a state of a native or web-based app based on the user input/search query 118 and select one or more app state IDs from the identified records. The search system 100 (e.g., the result generation module 112) may then generate the search results 124 based on the selected app state IDs. Additionally, or alternatively, the search system 100 may generate one or more other types of search results (e.g., those unrelated to states of native or web-based apps) based on the user input/search query 118. In any case, upon generating the search results 124, the search system 100 transmits the results 124 to the user device 102. The user device 102 receives the search results 124 from the search system 100 and displays the received results 124 to the user, e.g., as one or more user selectable links.

In block 306, the messaging system 104 (e.g., the message ID module 114 in conjunction with the data store 116) determines that the user input/search query 118 includes a message. For example, as described herein, the messaging system 104 may determine that the user input/search query 118 includes one or more of a reference to a person's name (e.g., a name included in a contacts list), a messaging slang term (e.g., a messaging abbreviation term), a messaging expression term, an emoticon, a punctuation character, a predetermined term, a predetermined phrase, a predetermined number of characters, a predetermined number of terms, and a predetermined usage of grammar. In some examples, the user device 102 includes, or is in communication with, the messaging system 104, in which case the device 102 may make the above-described determination. In other examples, the search system 100 may include, or be in communication with, the messaging system 104, in which case the system 100 may make the this determination. In other words, in some examples, the messaging system 104 is integrated with (e.g., included in) one or more of the user device 102 and the search system 100.

In additional examples, the messaging system 104 may determine that the user input/search query 118 includes a message using a trained classifier. The classifier may be configured (e.g., trained) to distinguish conversational text (e.g., messaging terms), such as emails, instant messages (IMs), etc., from non-messaging text (e.g., search terms), such as words and/or phrases used to perform searches for functions of native or web-based apps. In a specific example, the messaging system 104 (e.g., in conjunction with the user device 102) may configure (e.g., train) aversion of such a classifier that is customized to the user of the user device 102 by parsing (e.g., scanning) the user's data (e.g., with the user's permission). As a result, the classifier may reflect the user's personal messaging and/or search behavior or characteristics (e.g., be able to distinguish between text the user uses for messaging and text the user users to perform searches). For instance, if the user commonly uses the term "lambchop" in messages to refer to the user's significant other (e.g., such as in the phrase "lambchop, movie tonight?"), the classifier may be configured to recognize the term "lambchop" included in a user input/search query 118 as a messaging term rather than as a search term. As a result, the messaging system 104 may generate a messaging result 126 including an AM "func://facebook.com/sendmessage?to=husbandname&message=lambchop+movies+tonight?" that references a messaging component of Facebook. For another user who does not use the term "lambchop" in messages, the classifier may be configured to recognize the term "lambchop" as a search term rather than as a messaging term. As a result, the search system 100 may generate a search result 124 including an AM "func://flixster.com/searchShowtimes?q=lambchop" referencing a state of a non-messaging native app "Flixter®" by Flixter, Inc. In other examples, the classifier described above may be trained using so-called "click data" that indicates the number of times (and, e.g., how frequently) one or more users of user devices 102 have selected a search result 124 or a messaging result 126 generated in response to a specific user input/search query 118. In these examples, the click data may designate one or more terms of the user input/search query 118 as either a search term or a messaging term based on the user selections. In any case, the LUTs, or lists, included in the data store 116 as described herein may include (e.g., store) the one or more search terms and messaging terms determined using the classifier.

Upon determining that the user input/search query 118 includes a message, in block 308, the messaging system 104 (e.g., the message ID module 114 in conjunction with the data store 116) identifies one or more messaging apps. In some examples, the messaging system 104 identifies the messaging app(s) 208 included on the user device 102 (e.g., using the messaging app IDs generated using the messaging app ID module 206). Additionally, or alternatively, the messaging system 104 may identify one or more messaging apps not included on the user device 102 (e.g., popular or new messaging apps, or those specified by the user or other users). For example, the messaging system 104 (e.g., the message ID module 114 in conjunction with the data store 116) may identify a messaging app based on (e.g., a reference to the app in) the user input/search query 118. In some examples, the messaging system 104 identifies the messaging app(s) 208 and/or the messaging app(s) not included on the user device 102 by determining that each app is able to send and receive messages with respect to the person (e.g., a name included in a contacts list) referenced by the user input/search query 118. For example, with reference to the messaging app(s) 208, the messaging system 104 may identify the app(s) 208 by determining that each app 208 includes the person's name in a contacts list used by the app 208. In any case, upon identifying the messaging apps, in block 310, the messaging system 104 generates one or more messaging results 126 that each indicate one of the identified messaging apps and transmits the results 126 to the user device 102. In some examples, to generate a particular messaging result 126, the search system 100 initially identifies an app state record included in the data store 110 that specifies a state of the corresponding messaging app based on the user input/search query 118, select an app state ID from the identified record, and generate the messaging result 126 based on the selected app state ID, in a similar manner as described above with reference to the search results 124. In these examples, the messaging system 104 may further process the messaging result 126 (e.g., include link, ad, and/or other data and/or insert the message and/or the recipient into the result 126).

Also in block 310, the user device 102 receives the messaging results 126 from the messaging system 104 and displays the results 126 to the user, e.g., as one or more user selectable links. For example, the messaging system 104 may generate one messaging result 126 for each messaging app identified by the system 104. The user device 102 may display one user selectable link for each messaging result 126 received from the messaging system 104. In this example, each user selectable link may, upon being selected by the user, cause the user device 102 to launch (e.g., after downloading and installing) the messaging app indicated by the corresponding messaging result 126.

In block 312, the user device 102 receives, or detects, a user selection of one of the displayed messaging results 126 from the user. For example, the user may select the messaging result 126 by clicking, or tapping on a region of a display of the user device 102 used to display the result 126 (e.g., as a user selectable link). In block 314, in response to receiving the user selection, the user device 102 launches the messaging app indicted by the selected messaging result 126. In some examples, as shown in block 316, upon launching the messaging app, the user device 102 optionally inserts the message included in the user input/search query 118 into the launched app (e.g., into a message input field of the app configured to receive messages from users of the app). In other examples, as shown in block 318, in cases where the user input/search query 118 references a name associated with contact information stored on the user device 102 (e.g., a name included in a contacts list), upon launching the messaging app, the device 102 may optionally insert the name into the app (e.g., into a recipient input field of the app configured to receive one or more recipient names from users of the app).

Alternatively, when the messaging system 104 determines that the user input/search query 118 does not include a message, the system 104 may refrain from identifying the messaging apps, generating the messaging results 126, and transmitting the results 126 to the user device 102. In these examples, the user device 102 may display the search results 124 to the user without displaying the messaging results 126.

FIG. 4A is a functional block diagram of an example search system 100 including an example search module 108, data store 110, and result generation module 112. In the example of FIG. 4A, the search module 108 receives a search query (e.g., a user input) 118 from a user device 102 and identifies one or more app state records included in the data store 110 using the input/query 118. The search module 108 then transmits one or more app state IDs 172 associated with (e.g., selected from) the identified app state records to the result generation module 112. The result generation module 112 receives the app state IDs 172 and generates one or more search results 124 based on the IDs 172. In this example, the search results 124 specify one or more states of native or web-based apps. For example, the search results 124 may reference one or more native apps and indicate one or more operations for the apps to perform. Additionally, or alternatively, the search results 124 may include one or more resource identifiers (e.g., URLs, such as web addresses used with HTTP). The result generation module 112 transmits the search results 124 to the user device 102. Additionally, or alternatively, the search module 108, data store 110, and result generation module 112 may generate the search results 124 to include other types of data (e.g., unrelated to states of native or web-based apps). As described herein, the search system 100 may transmit link (e.g., text and/or image) data and other information (e.g., result scores, or ranking values) to the user device 102 with the search results 124, such that the device 102 can display the results 124 as one or more user selectable links.

FIG. 4B is a functional block diagram of an example messaging system 104 including an example message ID module 114 and data store 116. In the example of FIG. 4B, the message ID module 114 receives the user input/search query 118 from the user device 102 (e.g., via the search system 100) and determines whether the input/query 118 includes a message. As described herein, to make this determination, the message ID module 114 may determine one or more of whether the user input/search query 118 references a person's name (e.g., a name included in a contacts list), whether the input/query 118 includes one or more of a messaging slang term, messaging abbreviation term, messaging expression term, emoticon, and punctuation character, and whether the input/query 118 includes one or more of a predetermined term, phrase, number of characters, number of terms, and usage of grammar. The data store 116 may include various types of data that facilitates the above-described determination by the message ID module 114. For example, the data store 116 may include a contacts list associated with the user device 102 that includes names of one or more persons. The message ID module 114 may use the contacts list to determine whether the user input/search query 118 includes a message. The data store 116 may further include one or more messaging slang terms, messaging abbreviation terms, messaging expression terms, emoticons, and punctuation characters (e.g., as part of LUT, or a list) that the message ID module 114 may use to make this determination. The data store 116 may also include one or more predetermined terms, phrases, numbers of characters, numbers of terms, and usages of grammar (e.g., as part of an LUT, or a list) that the message ID module 114 may use to make the same determination.

As described herein, in some examples, the messaging system 104 is included in (e.g., integrated with) one of the user device 102 and search system 100. In other examples, the messaging system 104 may be a stand-alone system that is independent of any of the user device 102 and search system 100. In examples where the messaging system 104 is included in the user device 102, upon determining that the user input/search query 118 includes a message, the message ID module 114 may generate one or more messaging results 126. For example, the message ID module 114 may generate the messaging results 126 such that each result 126 indicates either one of the messaging app(s) 208 included on the user device 102, or a messaging app not included on the device 102. The message ID module 114 may further generate each messaging result 126 such that the result 126 also indicates the message included in the user input/search query 118 and/or a name of a recipient for the message (e.g., in cases where the input/query 118 references the name of the recipient). In examples where the messaging system 104 is included in the search system 100, or is a stand-atone system, upon determining that the user input/search query 118 includes a message, the message ID module 114 may generate the messaging results 126 in a similar manner as described above and transmit the results 126 to the user device 102 (e.g., via the search system 100). In some examples, the message ID module 114 receives the messaging app ID(s) from the user device 102 (e.g., as part of the query wrapper that includes the user input/search query 118) and determine the messaging app(s) 208 based on the received ID(s). The message ID module 114 may then generate the messaging results 126 such that one or more of the results 126 each indicate one of the messaging app(s) 208. Additionally, or alternatively, the message ID module 114 may receive (e.g., from the user device 102 and/or search system 100) other data indicating one or more messaging apps not included on the device 102 (e.g., popular or new messaging apps, or those specified by the user or other users) and generate the messaging results 126 such that one or more of the results 126 each indicate one of the messaging apps not included on the device 102.

In the examples described above, the messaging system 104 may also transmit link (e.g., text and/or image) data, ad data, and any additional information (e.g., one or more result scores, ranking values, or values of other ranking metrics) to the user device 102 with the messaging results 126. The user device 102 may use the additional data to display the messaging results 126 as one or more user selectable links (e.g., with the one or more user selectable links generated by the device 102 for the search results 124).

FIGS. 5A-5B illustrate example GUIs that may be generated on a user device 102 according to the present disclosure. FIG. 5A shows an example GUI of a search app 202 included on the user device 102. FIG. 5B, in turn, shows an example GUI of a messaging app 208 also included on the user device 102 after the device 102 has launched the app 208 in response to a user of the device 102 interacting with the GUI shown in FIG. 5A.

In FIG. 5A, the user of the user device 102 has entered a user input (e.g., a search query) 118 ("meet me at subway in 20 min") into a search field 120 of the GUI of the search app 202. The user has selected (e.g., touched, or clicked on) a search button 122 of the GUI, causing the user device 102 to transmit the user input/search query 118 to the search system 100 and messaging system 104, e.g., as part of a query wrapper. The search system 100 has received the user input/search query 118 from the user device 102 and has generated one or more search results 124 based on the input/query 118. The messaging system 104 has also received the user input/search query 118 from the user device 102 (e.g., via the search system 100). Upon determining that the user input/search query 118 includes a message, the messaging system 104 has generated one or more messaging results 126 that each indicate either one of the messaging app(s) 208 included on the user device 102, or a messaging app not included on the device 102.

In the example of FIG. 5A, the search results 124 generated by the search system 100 based on the user input/search query 118 relate to "Subway®" restaurants. Specifically, the search results 124 correspond to an entry in Yelp for a particular "Subway®" restaurant located in Mountain View, Calif., a home web page for "Subway®" restaurants located at the URL "www.subway.com," and a "Wikipedia®" entry for "Subway®" restaurants, as described with reference to FIG. 2. Upon generating the search results 124 based on the user input/search query 118, the search system 100 has transmitted the results 124 to the user device 102. In this example, the search system 100 has also transmitted link (e.g., text and/or image) data associated with each search result 124 to the user device 102. The user device 102 has generated user selectable links (hereinafter, "links") 132, 134, and 136 depicted in FIG. 5A using the link data. The links 132-136 are associated with the search results 124 that correspond to the entry in Yelp for the "Subway®" restaurant located in Mountain View, Calif., the home web page for "Subway®" restaurants located at the URL "www.subway.com," and the "Wikipedia®" entry for "Subway®" restaurants, respectively. As shown in FIG. 5A, the links 132-136 each include a description (e.g., as specified by the link data) of the corresponding search result 124. Additionally, or alternatively, the links 132-136 may each include one or more images associated with the corresponding search result 124 (e.g., as also specified by the link data).

In this example, the messaging results 126 generated by the messaging system 104 upon determining that the user input/search query 118 includes a message each indicate either one of the messaging app(s) 208, or a messaging app not included on the user device 102, as described above. Specifically, the messaging results 126 indicate a first one of the messaging app(s) 208 (i.e., Messaging App 1), a second one of the app(s) 208 (i.e., Messaging App 2), and a third messaging app not included on the user device 102 (i.e., Messaging App 3). Upon generating the messaging results 126, the messaging system 104 has transmitted the results 126 to the user device 102 (e.g., via the search system 100. In this example, the messaging system 104 has also transmitted link (e.g., text and/or image) data associated with each messaging result 126 to the user device 102. The user device 102 has generated links 128, 138, and 142 shown in FIG. 5A using the link data. The links 128, 138, and 142 are associated with the messaging results 126 that indicate Messaging Apps 1, 2, and 3, respectively. As shown, the links 128, 138, and 142 each include a description (e.g., as specified by the link data) of the corresponding messaging result 126 (i.e., a name of the corresponding one of Messaging Apps 1-3). Each link 128, 138, 142 also includes an image (e.g., an icon) associated with the corresponding messaging result 126 (i.e., the corresponding one of Apps 1-3), e.g., as also specified by the link data.

As shown in FIG. 5A, the links 128 and 138 include launching GUI elements 130 and 140, respectively that each include the string "Open." The GUI elements 130, 140 may indicate to the user that, upon the user selecting the corresponding one of the links 128, 138 (e.g., upon the user selecting the corresponding one of the elements 130, 140), the user device 102 may launch the corresponding one of Messaging Apps 1 and 2 on the device 102. In some examples, the GUI elements 130, 140 further indicate to the user (e.g., via the string "Open") that Messaging Apps 1 and 2 are included on the user device 102. As also shown in FIG. 5A, the link 142 includes a downloading GUI element 144 that includes the string "Download." The GUI element 144 may indicate to the user that, upon the user selecting the link 142 (e.g., upon the user selecting the element 144), the user device 102 may download Messaging App 3 (e.g., from a digital distribution platform using an ADA included in the link 142). For example, upon the user selecting the link 142, the user device 102 may prompt the user to download Messaging App 3 onto the device 102 and/or install App 3 on the device 102. In some examples, the GUI element 144 further indicates to the user (e.g., via the string "Download") that Messaging App 3 is not included on the user device 102. As also shown in FIG. 5A, the link 142 includes an ad GUI element 146 that includes the string "AD." The GUI element 146 may indicate to the user that Messaging App 3 corresponding to the link 142 is associated with an ad. In some examples, the GUI element 146 further indicates to the user that, upon the user selecting the link 142 (e.g., upon the user selecting the element 146), the user device 102 may display terms and/or conditions of the ad to the user (e.g., in conjunction with prompting the user to download and/or install Messaging App 3). The ad may specify a monetary discount or credit associated with purchasing Messaging App 3 and/or with using services or functions provided by App 3. In the examples described above, the link data received by the user device 102 from any of the systems 100, 104 may include the (e.g., text and/or image) data used by the device 102 to generate one or more of the GUI elements 130, 140, and 144. Also, ad data received by the user device 102 from any of the systems 100, 104 and/or another (e.g., ad) system may include the (e.g., text and/or image) data used by the device 102 to generate the GUI element 146.

As shown in FIG. 5A, each of the links 128, 132, 134, 136, 138, and 142 includes text and/or image data (e.g., the text "Subway®-Mountain View, Calif.| Yelp" included in the link 132, or the icon associated with Messaging App 1 included in the link 128). In some examples, some or all of the links 128, 132-136, 138, and 142 include other data, such as user ratings data (e.g., in the form of one to five stars), user review data, etc. The text and/or image data and other data for each of the links 128, 132-136, 138, and 142 may be included in link data associated with the corresponding link. As described herein, the user may select (e.g., touch, or click on) any of the links 128, 132-136, 138, and 142 to cause the user device 102 to access the corresponding one of the search results 124, or to launch one of Messaging Apps 1, 2, and 3 indicated by the corresponding one of the messaging results 126. For example, to select each of the links 128, 132-136, 138, and 142, the user may select (e.g., touch, or click on) an area of the GUI depicted in FIG. 5A used to display the link.

In the example GUI of FIG. 5A, the links 128, 132-136, 138, and 142 are distributed (e.g., interleaved) within the GUI. In other examples, the links 128, 132-136, 138, and 142, or one or more other links, may be distributed differently than shown in FIG. 5A. For example, the links may not be interleaved as shown in FIG. 5A, but rather grouped based on whether the links are associated with the search results 124 or messaging results 126. In still other examples, the links may be arranged, or ordered, in a variety of other manners.

Although only links 128, 132-136, 138, and 142 are shown in the GUI of FIG. 5A, the search system 100 and messaging system 104 may have generated one or more additional search results 124 and messaging results 126, respectively, and transmitted the results 124, 126 to the user device 102 in the manner described above. The user device 102 may have generated one or more additional links not shown in FIG. 5A using the additional results 124, 126.

In the example of FIGS. 5A-5B, the user selects the link 128. As described above, the user device 102 generated the link 128 for one of the messaging results 126 received by the device 102 from the messaging system 104. As also described above, the messaging result 126 for which the user device 102 generated the link 128 indicates one of the messaging app(s) 208 included on the device 102 (i.e., Messaging App 1). To select the link 128, the user may touch, or click on, an area of the GUI of the search app 202 used to display the link 128, e.g., on the GUI element 130 of the link 128. In response to the user selecting the link 128 and/or GUI element 130, the user device 102 launches the messaging app 208 indicated by the messaging result 126 for which the device 102 generated the link 128 (i.e., Messaging App 1). In some examples, upon launching the messaging app 208, the user device 102 (e.g., the app 208) further inserts the message included in the user input/search query 118 into a message input field 150 of the app 208. Additionally, or alternatively, upon launching the messaging app 208, the user device 102 (e.g., the app 208) may also specify a recipient (e.g., a name of the recipient) for the message using a recipient input field 152 of the app 208 (e.g., in cases where the user input/search query 118 references the name of the recipient).

FIG. 5B illustrates an example GUI 148A of the messaging app 208 indicated by the messaging result 126 for which the user device 102 generated the link 128 (i.e., Messaging App 1). In other words, the GUI 148A represents a GUI, or screen, displayed by the messaging app 208 (i.e., Messaging App 1) upon the user device 102 launching the app 208 in response to the user selecting the link 128. As shown in FIG. 5B, the GUI 148A includes a message input field 150 of the messaging app 208 into which the user device 102 (e.g., the app 208) has inserted the message that is included in the user input/search query 118. In other examples, the user may modify the message entered into the message input field 150, or enter a new message into the field 150. As also shown, the GUI 148A further includes a recipient input field 152 of the messaging app 208 where the user may specify a recipient for the message (e.g., by entering a name of the recipient, or selecting the name from a contacts list included on the user device 102).

FIGS. 5C-5D depict elements and user interactions that are analogous to those described above with reference to FIGS. 5A-5B. In FIG. 5C, the user input/search query 118 is a string "John," which may correspond to a name of a person (e.g., a person included in a contacts list on the user device 102). In this example, to determine that the user input/search query 118 includes a message, the messaging system 104 may determine that the input/query 118 references a person's name (e.g., a name included in a contacts list on the user device 102). Also in this example, to generate the messaging results 126, the messaging system 104 may identify the messaging app(s) 208 and/or the messaging app(s) not included on the user device 102 by determining that each app is able to send and receive messages with respect to this person (e.g., by determining that the person's name is included in a contacts list of the app). In any case, in response to the user selecting the link 128 and/or GUI element 130, the user device 102 launches Messaging App 1. In some examples, upon launching Messaging App 1, the user device 102 (e.g., App 1) specifies the person (e.g., the name) referenced by the user input/search query 118 as a recipient for a message using the recipient input field 152 of App 1.

FIG. 5D depicts an example GUI 148B of Messaging App 1 displayed upon the user device 102 launching App 1 in response to the user selecting the link 128. As shown in FIG. 5D, the GUI 148B includes the recipient input field 152 of Messaging App 1 into which the user device 102 (e.g., App 1) has inserted the name of the person referenced by the user input/search query 118. In other examples, the user may modify the recipient specified in the recipient input field 152, or enter a new and/or an additional recipient into the field 152. As also shown, the GUI 148B further includes the message input field 150 of Messaging App 1 into which the user device 102 (e.g., App 1) may enter a message for the specified recipient(s).

FIGS. 6A-6B illustrate other example GUIs that may be generated on a user device 102 according to the present disclosure. Specifically, FIG. 6A shows an example GUI of a search app 202 included on a user device 102. The GUI of FIG. 6A includes an expandable GUI element 156 that, upon being selected (e.g., touched, or clicked on) by the user of the user device 102, expands to display one or more messaging results 126 that each indicate a messaging app. FIG. 6B, in turn, shows another example GUI of the search app 202 after the user has selected the expandable GUI element 156, causing the element 156 to expand and display the messaging results 126 in the manner described above.

In FIG. 6A, the user of the user device 102 has entered a user input (e.g., a search query) 118 ("John meet me at subway") into a search field 120 of the GUI of the search app 202. The user has selected (e.g., touched, or clicked on) a search button 122 of the GUI, causing the user device 102 to transmit the user input/search query 118 to the search system 100 and messaging system 104, e.g., as part of a query wrapper. The search system 100 has received the user input/search query 118 from the user device 102 and has generated one or more search results 124 based on the input/query 118. The messaging system 104 has also received the user input/search query 118 from the user device 102 (e.g., via the search system 100). Upon determining that the user input/search query 118 includes a message, the messaging system 104 has generated one or more messaging results 126 that each indicate either one of the messaging app(s) 208 included on the user device 102, or a messaging app not included on the device 102.

In the example of FIG. 6A, the search results 124 generated by the search system 100 based on the user input/search query 118 relate to "Subway®" restaurants. Specifically, the search results 124 correspond to an entry in Yelp for a particular "Subway®" restaurant located in Mountain View, Calif., a home web page for "Subway®" restaurants located at the URI "www.subway.com," and a "Wikipedia®" entry for "Subway®" restaurants, as described with reference to FIG. 2. The search results 124 also correspond to an entry in Yelp for a particular "Subway®" restaurant located in Sunnyvale, Calif., and an entry for "Subway®" restaurants in the online social media app "Twitter®" by Twitter Inc. Upon generating the search results 124 based on the user input/search query 118, the search system 100 has transmitted the results 124 to the user device 102. In this example, the search system 100 has also transmitted link (e.g., text and/or image) data associated with each of the search results 124 to the user device 102. The user device 102 has generated user selectable links (hereinafter, "links") 132, 134, 136, 158, and 160 depicted in FIG. 6A using the link data. The links 132-136, 158-160 are associated with the search results 124 that correspond to the entry in Yelp for the "Subway®" restaurant located in Mountain View, Calif., the home web page for "Subway®" restaurants located at the URL "www.subway.com," the "Wikipedia®" entry for "Subway®" restaurants, the entry in Yelp for the "Subway®" restaurant located in Sunnyvale, Calif., and the entry for "Subway®" restaurants in "Twitter®," respectively. As shown in FIG. 6A, the links 132-136, 158-160 each include a description (e.g., as specified by the link data) of the corresponding search result 124. Additionally, or alternatively, the links 132-136, 158-160 may each include one or more images associated with the corresponding search result 124 (e.g., as also specified by the link data).

In this example, the messaging results 126 generated by the messaging system 104 upon determining that the user input/search query 118 includes a message each indicate either one of the messaging app(s) 208, or a messaging app not included on the user device 102, as described above. Specifically, the messaging results 126 indicate a first, second, and third one of the messaging app(s) 208 (i.e., Messaging Apps 1, 2, and 3) and a messaging app not included on the user device 102 (i.e., "Messaging App 4"). As described herein, the messaging system 104 may have identified any of the Messaging Apps 1-4 by determining that each app is able to send and receive messages with respect to the person (i.e., John) referenced by the user input/search query 118 (e.g., by determining that the person's name is included in a contacts list used by the app). Upon generating the messaging results 126 in response to determining that the user input/search query 118 includes a message, the messaging system 104 has transmitted the results 126 to the user device 102 (e.g., via the search system 100). In this example, the messaging system 104 has also transmitted link (e.g., text and/or image) data associated with each messaging result 126 to the user device 102. The user device 102 has generated a messaging app header GUI element 154, the expandable GUI element 156, and links 128, 138, 162, and 166 depicted in FIGS. 6A-6B using the link data. As shown in FIG. 6A, the user device 102 (e.g., the search app 202) displays the GUI elements 154 and 156 along with the links 132-136, 158-160. The GUI element 154 (i.e., including the string "Send message using . . . ") indicates to the user that the user may send the message included in the user input/search query 118 using one of a number of messaging apps (e.g., Messaging Apps 1-4). The expandable GUI element 156 (i.e., including the string "More . . . " and an image of an envelope) indicates to the user that the user may select (e.g., touch, or click on) the element 156 to cause the user device 102 (e.g., the search app 202) to display one or more links (e.g., the links 128, 138, 162, and 166) that indicate the messaging apps. Specifically, as described above, upon being selected by the user, the GUI element 156 expands to display, as the one or more links, one or more of the messaging results 126 received from the messaging system 104 that each indicate one of the messaging apps.

In the example of FIGS. 6A-6B, the user selects the GUI element 156. As described above, the user device 102 generated the GUI element 156 using link data received along with, or as part of, the messaging results 126 by the device 102 from the messaging system 104. As also described above, upon being selected by the user, the GUI element 156 expands to display one or more of the messaging results 126 (e.g., as one or more links) that each indicate a messaging app. To select the GUI element 156, the user may touch, or click on, an area of the GUI of the search app 202 used to display the element 156, e.g., including an area of the GUI used to display the GUI element 154. In response to the user selecting the GUI element 156 and/or 154, the user device 102 causes the element 156 to expand and displays one or more of the messaging results 126 that each indicate a messaging app.

FIG. 6B illustrates the example GUI of the search app 202 shown in FIG. 6A after the user has selected the GUI element 156. As shown in FIG. 6B, the links 128, 138, and 162 include launching GUI elements 130, 140, and 164, respectively that each include the string "Open." The GUI elements 130, 140, 164 may indicate to the user that, upon the user selecting the corresponding one of the links 128, 138, 162 (e.g., upon the user selecting the corresponding one of the elements 130, 140, 164), the user device 102 may launch the corresponding one of Messaging App 1, 2, and 3 on the device 102. In some examples, the GUI elements 130, 140, 164 further indicate to the user (e.g., via the string "Open") that Messaging Apps 1, 2, and 3 are included on the user device 102. As also shown in FIG. 6B, the link 166 includes a downloading GUI element 144 that includes the string "Download." The GUI element 144 may indicate to the user that, upon the user selecting the link 166 (e.g., upon the user selecting the element 144), the user device 102 may download Messaging App 4 (e.g., from a digital distribution platform using an ADA included in the link 166). For example, upon the user selecting the link 166, the user device 102 may prompt the user to download Messaging App 4 onto the device 102 and/or install Messaging App 4 on the device 102. In some examples, the GUI element 144 further indicates to the user (e.g., via the string "Download") that Messaging App 4 is not included on the user device 102. As also shown in FIG. 6B, the link 166 includes an ad GUI element 146 that includes the string "AD." The GUI element 146 may indicate to the user that Messaging App 4 corresponding to the link 166 is associated with an ad. In some examples, the GUI element 146 further indicates to the user that, upon the user selecting the link 166 (e.g., upon the user selecting the element 146), the user device 102 may display terms and/or conditions of the ad to the user (e.g., with prompting the user to download and/or install Messaging App 4). The ad may specify a monetary discount or credit associated with purchasing Messaging App 4 and/or with using services or functions it provides. In these examples, the link data received by the user device 102 from any of the systems 100, 104 may include the (e.g., text and/or image) data used by the device 102 to generate one or more of the GUI elements 130, 140, and 164. Also, additional (e.g., ad) data received by the user device 102 from any of the systems 100, 104 and/or another (e.g., ad) system may include the (e.g., text and/or image) data used by the device 102 to generate the GUI element 146.

As shown in FIG. 6B, the user device 102 (e.g., the search app 202) displays the links 128, 138, 162, and 166 upon the user selecting the GUI element 156. As also shown in FIG. 6B, as a result of displaying the links 128, 138, 162, and 166, the user device 102 (e.g., the search app 202) displays fewer of (e.g., shifts downward) the links 132-136, 158-160. The links 128, 138, 162, and 166 are associated with the messaging results 126 that indicate Messaging Apps 1, 2, 3, and 4, respectively. As also shown, the links 128, 138, 162, and 166 each include a description (e.g., as specified by the link data) of the corresponding messaging result 126 (i.e., a name of the corresponding one of Messaging Apps 1, 2, 3, and 4). Each links also includes an image (e.g., an icon) associated with the corresponding messaging result 126 (i.e., the corresponding one of Messaging Apps 1, 2, 3, and 4), e.g., as also specified by the link data.

As shown in FIG. 6B, each of the links 128, 132, 134, 138, 162, and 166 includes text and/or image data (e.g., the text "Subway®-Mountain View, Calif.|Yelp" included in the link 132, or the icon associated with Messaging App 1 included in the link 128). In some examples, some or all of the links 128, 132, 134, 138, 162, and 166 include other data, such as user ratings data (e.g., in the form of one to five stars), user review data, etc. The text and/or image data and other data tier each of the links 128, 132, 134, 138, 162, and 166 may be included in link data associated with the corresponding link. As described herein, the user may select (e.g., touch, or click on) any of the links 128, 132, 134, 138, 162, and 166 to cause the user device 102 to access the corresponding one of the search results 124, or to launch (e.g., after downloading and installing) one of Messaging Apps 1, 2, 3, and 4 indicated by the corresponding one of the messaging results 126. For example, to select each of the links 128, 132, 134, 138, 162, and 166, the user may select (e.g., touch, or click on) an area of the GUI of FIG. 6B used to display the link. In the example GUI of FIG. 6B, upon the GUI element 156 expanding to display the links 128, 138, 162, and 166, the links 136, 158, and 160 depicted in FIG. 6A are shifted downward on (i.e., removed from) the display of the user device 102. In other examples, some or all of the links 136, 158, 160 may remain displayed in the GUI of the search app 202 and/or may be rearranged, re-ordered, or resized in a variety of manners.

FIGS. 6C-6D depict elements and user interactions that are analogous to those described above with reference to FIGS. 5B, 5D, and 6B. In particular, FIG. 6C shows the example GUI of the search app 202 depicted in FIG. 6B. In the example of FIG. 6C, the user selects the link 128. FIG. 6D, in turn, depicts an example GUI 148C of Messaging App 1 displayed upon the user device 102 launching App 1 in response to the user selecting the link 128. As shown in FIG. 6D, the GUI 148C includes the recipient input field 152 of Messaging App 1 into which the user device 102 (e.g., App 1) has inserted the name of the person (i.e., "John") referenced by the user input/search query 118. In other examples, the user may modify the recipient specified in the recipient input field 152, or enter a new and/or an additional recipient into the field 152. As also shown, the GUI 148C further includes the message input field 150 of Messaging App 1 into which the user device 102 (e.g., App 1) has inserted the message (i.e., "meet me at subway") included in the user input/search query 118. In other examples, the user may modify the message entered into the message input field 150, or enter a new message into the field 150.

In the example of FIGS. 6C-6D, to determine that the user input/search query 118 includes a message, the messaging system 104 may determine that the input/query 118 references a person's name (e.g., a name included in a contacts list on the user device 102), as described herein. For example, the messaging system 104 may parse the user input/search query 118 and identify the string "John" as the person's name. The messaging system 104 may also determine that the user input/search query 118 includes a message by parsing the input/query 118 for one or more characters, terms, phrases, and/or other characteristics of the input/query 118, as also described herein. For instance, the messaging system 104 may identify these characteristics in the "meet me at subway" portion of the user input/search query 118. Also in this example, to generate the messaging results 126, the messaging system 104 may identify the messaging app(s) 208 and/or the messaging app(s) not included on the user device 102 by determining that each app is able to send and receive messages with respect to the person (e.g., by determining that the person's name is included in a contacts list of the app), as further described herein.

FIGS. 7A-7B illustrate other example GUIs that may be generated on the user device 102 according to the present disclosure. Specifically, FIG. 7A shows an example GUI of a search app 202 included on the user device 102. The GUI of FIG. 7A includes a link 128 generated using one of the messaging results 126 received by the user device 102 from the messaging system 104. The messaging result 126 associated with the link 128 indicates one of the messaging app(s) 208 included on the user device 102. In the example of FIG. 7A, the link 128 includes a recipient GUI element 168 configured to, upon being selected by a user of the user device 102, expand to display one or more recipients (e.g., names of recipients). The user may select any of the recipients as a recipient for a message included in the user's user input/search query 118. Upon selecting one or more of the recipients, the user may select the link 128, causing the user device 102 to launch the messaging app 208, insert the message into the app 208, and specify the selected recipient(s) as one or more recipients for the message within the app 208 (as described below with reference to FIGS. 8A-8B). FIG. 7B shows an example GUI of the search app 202 after the user has selected the GUI element 168, causing the element 168 to expand and display the one or more recipients in the manner described above.

The GUIs of FIGS. 7A-7B include similar search results 124, messaging results 126, and GUI elements as those of the GUI of FIG. 5A. In FIGS. 7A-7B, the link 128 includes the recipient GUI element 168 described above. As shown in FIG. 7A, the user has selected the GUI element 168, causing the element 168 to expand and display one or more recipients (e.g., names of recipients), as shown in FIG. 7B. The recipients may correspond to one or more names within a contacts list included on the user device 102, as described herein. The user has subsequently selected one of the recipients as a recipient for a message included in the user's user input/search query 118, as shown in FIG. 7B. Upon selecting one of the recipients, the GUI element 168 may contract to display the selected recipient (as described below with reference to FIG. 8A).

In the example of FIG. 7A, the GUI element 168 expands to display the recipients using a so-called "drop-down menu." In other examples, the GUI element 168 may be another GUI element that expands, or is otherwise modified (e.g., replaced with a list, or other representation of the recipients), to indicate the recipients to the user, and to enable the user to select any of the recipients, in a different manner than that shown in FIG. 7A.

FIGS. 8A-8B illustrate other example GUIs that may be generated on the user device 102 according to the present disclosure. Specifically, FIG. 8A shows the example GUI of the search app 202 depicted in FIG. 7B after the user has selected one of the recipients ("Edward F.") displayed to the user by the recipient GUI element 168. In this example, the user has selected "Edward F." as a recipient for the message included in the user's user input/search query 118. Upon selecting "Edward F.," and, optionally, one or more additional recipients, the user may select the link 128, causing the user device 102 to launch Messaging App 1, insert the message into App 1, and specify the selected recipient(s) as one or more recipients for the message within App 1. FIG. 8B shows an example GUI of the search app 202 after the user has selected the link 128, causing the user device 102 to launch Messaging App 1, insert the message into App 1, and specify "Edward F." as a recipient for the message in App 1, as described above.

The GUI of FIG. 8A includes similar search results 124, messaging results 126, and GUI elements as those of the GUI of FIG. 5A. In FIG. 8A, the link 128 includes the recipient GUI element 168 described above with reference to FIGS. 7A-7B. In this example, the user has previously selected the GUI element 168, causing the element 168 to expand and display one or more recipients. The user has then selected one of the recipients ("Edward F.") as a recipient for a message included in the user's user input/search query 118. As shown in FIG. 8A, upon selecting "Edward F.," the GUI element 168 has contracted to display "Edward F."

In the example of FIGS. 8A-8B, the user selects the link 128. As described above, the user device 102 generated the link 128 for one of the messaging results 126 received by the device 102 from the messaging system 104. As also described above, the messaging result 126 for which the user device 102 generated the link 128 indicates one of the messaging app(s) 208 included on the device 102 (i.e., Messaging App 1). To select the link 128, the user may touch or click on an area of the GUI of the search app 202 used to display the link 128, e.g., the GUI element 130. In response to the user selecting the link 128 and/or GUI element 130, the user device 102 launches Messaging App 1. In some examples, upon launching Messaging App 1, the user device 102 (e.g., App 1) inserts the message included in the user input/search query 118 into a message input field 150 of App 1. In other examples, upon launching Messaging App 1, the user device 102 (e.g., App 1) may also specify a recipient for the message using a recipient input field 152 of App 1 (e.g., based on the user's selection using the GUI element 168).

FIG. 8B illustrates an example GUI 170 of the messaging app 208 indicated by the messaging result 126 for which the user device 102 generated the link 128 (i.e., Messaging App 1). In other words, the GUI 170 represents a GUI or screen displayed by Messaging App 1 upon the user device 102 launching App 1 in response to the user selecting the link 128. As shown in FIG. 8B, the GUI 170 includes a message input field 150 of Messaging App 1 into which the user device 102 (e.g., App 1) has inserted the message included in the user input/search query 118. In other examples, the user may modify the message entered into the message input field 150, or enter a new message into the field 150. As also shown, the GUI 170 further includes a recipient input field 152 of Messaging App 1 into which the user device 102 (e.g., App 1) has inserted (e.g., a name of) the recipient for the message specified by the user. As described above, the user has specified the recipient by selecting the recipient from the expanded GUI element 168 shown in FIG. 7B. In other examples, the user may modify the recipient entered into the recipient input field 152, or enter additional recipients into the field 152.

Figure 9:
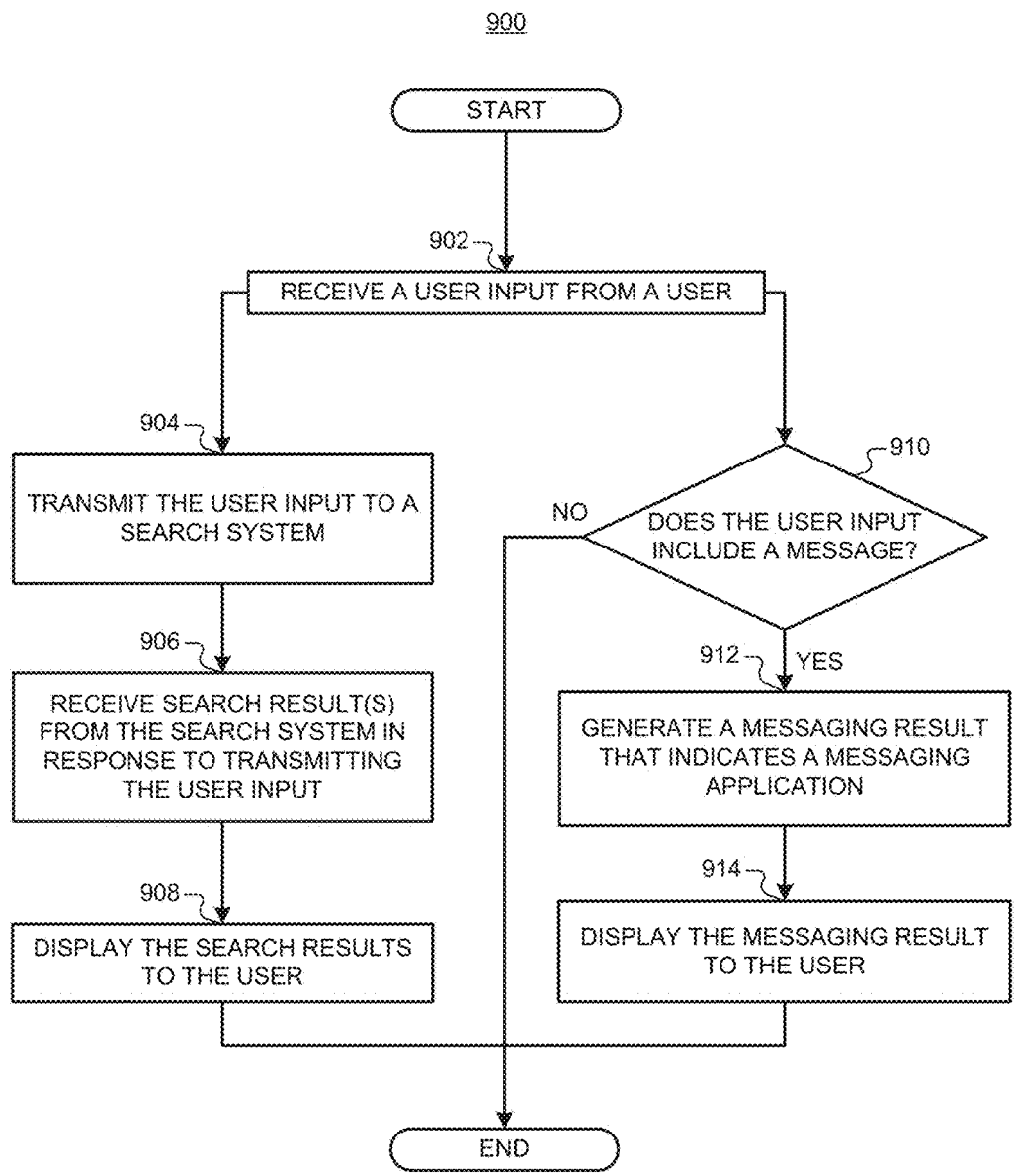
FIG. 9 is a flow diagram that illustrates an example method for receiving a user input at a user device and displaying search results and messaging results on the user device in response to receiving the user input.

FIG. 9 illustrates an example method 900 of receiving a user input 118 from a user of a user device 102, determining whether the input 118 includes a message, and, when the input 118 includes a message, displaying a messaging result 126 at the device 102 along with search results 124 that are responsive to the input 118. The user device 102 described with reference to the method 900 may include a search app 202 (e.g., a native or web-based app) configured to receive user inputs (e.g., search queries) 118 from users of the device 102 and communicate with the search system 100 and messaging system 104. Specifically, the search app 202 may generate a GUI that receives the user inputs/search queries 118 from the users, transmits the inputs/queries 118 to the search system 100 and messaging system 104, receives search results 124 from the search system 100 and messaging results 126 from the messaging system 104, and displays the results 124, 126. The method 900 is described with reference to the user device 102, search system 100, and messaging system 104, as depicted in FIG. 2.

In block 902, the user device 102 receives a user input (e.g., a search query) 118 from a user of the device 102. For example, the user may have entered the user input/search query 118 into a search field 120 of the GUI of the search app 202. The user may have entered the user input/search query 118 using any of a touchscreen keypad, a mechanical keypad, and/or via speech recognition techniques. In block 904, the user device 102 transmits the user input/search query 118 to the search system 100. For example, the user may have selected a search button 122 of the GUI to cause the user device 102 to transmit the user input/search result 118 to the search system 100. In block 906, the user device 102 receives one or more search results 124 from the search system 100 in response to transmitting the user input/search query 118. For example, the search results 124 may specify one or more states of native or web-based apps, as described herein. Additionally, or alternatively, the search results 124 may specify information that is unrelated to states of native or web-based apps, e.g., information relating to one or more web pages, documents, images, songs, videos, podcasts, and various other types of data, as described herein. In any case, in block 908, the user device 102 displays the search results 124 to the user (e.g., as one or more user selectable links).

In block 910, the messaging system 104 (e.g., the message ID module 114 in conjunction with the data store 116) determines whether the user input/search query 118 includes a message. For example, as described herein, to make this determination, the messaging system 104 may determine that the user input/search query 118 includes one or more of a reference to a person's name e.g., a name included in a contacts list), a messaging slang (e.g., a messaging abbreviation) term, a messaging expression term, an emoticon, a punctuation character, a predetermined term, a predetermined phrase, a predetermined number of characters, a predetermined number of terms, and a predetermined usage of grammar. In some examples, the user device 102 includes, or is in communication with, the messaging system 104, in which case the device 102 may make the above-described determination. In other examples, the search system 100 may include, or be in communication with the messaging system 104, in which case the search system 100 may make the above-described determination.

In the event the user input/search query 118 includes a message (i.e., the "YES" branch of block 910), the method 900 proceeds from block 910 to blocks 912-914. In block 912, the messaging system 104 generates a messaging result 126 that indicates a messaging app. For example, the messaging result 126 may indicate one of the messaging app(s) 208 included on the user device 102, or a messaging app not included on the device 102. In examples where the messaging result 126 indicates one of the messaging app(s) 208, the result 126 may be configured to, upon being selected by the user, cause the user device 102 to launch the app 208 indicated by the result 126. Alternatively, in examples where the messaging result 126 indicates a messaging app not included on the user device 102, the result 126 may be configured to, upon being selected by the user, cause the device 102 to download the app (e.g., from a digital distribution platform) using an ADA included in the result 126. Upon downloading the messaging app, the user device 102 may install and launch the app. As described herein, in some examples, the messaging system 104 generates the messaging result 126 such that the result 126 further indicates the message included in the user input/search query 118 and/or a recipient for the message (e.g., in cases where the input/query 118 references a name of the recipient). In some examples, the messaging system 104 also generates one or more additional messaging results 126 that each indicate a messaging app in a similar manner as described above. In any case, in examples where the messaging system 104 is not part of the user device 102, the system 104 then transmits the messaging result 126 (and, e.g., other result(s) 126) to the device 102.

In block 914, the user device 102 displays the messaging result 126 to the user (e.g., as a user selectable link). In these examples, the user device 102 may display the messaging result 126 and search results 124 as a list, e.g., by ordering the results 124, 126 in the list using one or more result scores, ranking values, or values of another ranking metric associated with the results 124, 126. Additionally, or alternatively, the user device 102 may display the results 124, 126 such that the two types of results are distinguishable to the user (e.g., using image, text, and/or other data to distinguish the results 124, 126).

In some examples, the user device 102 further receives, or detects, a selection of the displayed messaging result 126 from the user. For example, the user may select the messaging result 126 by clicking, or tapping on, a region of a display of the user device 102 used to display the result 126. In these examples, in response to receiving the user's selection, the user device 102 may launch the messaging app indicted by the messaging result 126. In some examples, upon launching the messaging app, the user device 102 inserts the message included in the user input/search query 118 into the app (e.g., into a message input field of the app configured to receive messages from users of the app). In other examples, in cases where the user input/search query 118 references a name associated with contact information stored on the user device 102 (e.g., a name included in a contacts list), upon launching the app, the device 102 may insert the name into the app (e.g., into a recipient input field of the app configured to receive one or more recipient names from users of the app).

Alternatively, when the user input/search query 118 does not include a message (i.e., the "NO" branch of block 910), the method 900 proceeds from block 910 directly to an end of the method 900, thereby bypassing blocks 912 and 914. In other words, if the input/search query 118 does not include a message, the user device 102 displays the search results 124 to the user without the messaging system 104 generating the messaging result 126 and transmitting the result 126 to the device 102, and without the device 102 displaying the result 126 to the user.

Figure 10:
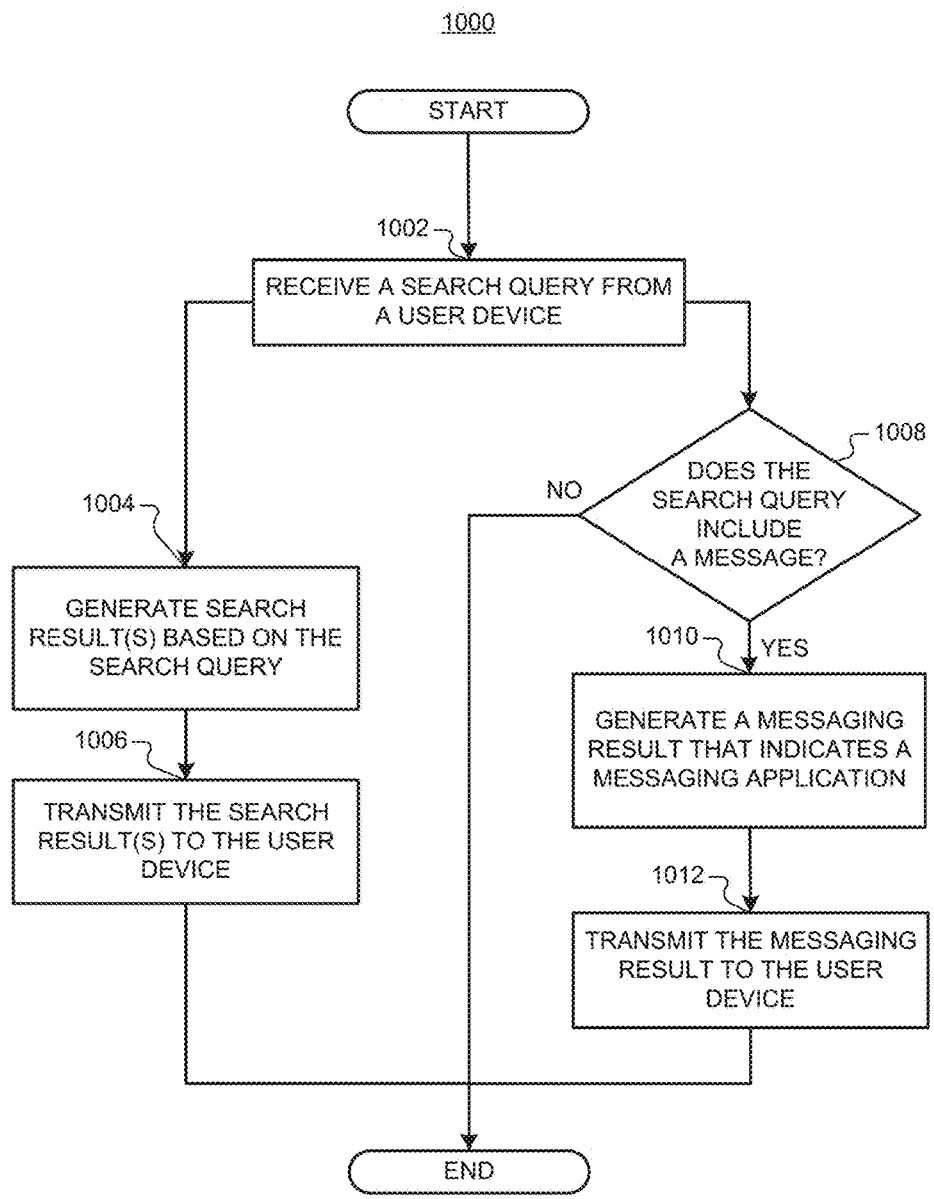
FIG. 10 is a flow diagram that illustrates an example method for generating search results and messaging results in response to receiving a search query from a user device.

FIG. 10 illustrates an example method 1000 of receiving a search query 118 from a user device 102, generating search results 124 that are responsive to the query 118 and transmitting the results 124 to the device 102, determining whether the query 118 includes a message, and, when the query 118 includes a message, generating a messaging result 126 and transmitting the result 126 to the device 102. The method 1000 is described with reference to the user device 102, search system 100, and messaging system 104, as depicted in FIG. 2.

In block 1002, the search system 100 receives a search query 118 from the user device 102. For example, a user of the user device 102 may have entered a user input into a search field 120 of a GUI of a search app 202 executing on the device 102 (e.g., using any of a touchscreen keypad, a mechanical keypad, and/or via speech recognition techniques). The user device 102 may have then transmitted the user input to the search system 100 as the search query 118. For example, the user may have selected a search button 122 of the GUI to cause the user device 102 to transmit the search query 118 to the search system 100.

In block 1004, the search system 100 generates one or more search results 124 based on the search query 118. For example, to generate the search results 124, the search system 100 (e.g., the search module 108) may identify one or more app state records included in the data store 110 based on the search query 118 and select one or more app state IDs 172 from the identified records. The search system 100 (e.g., the result generation module 112) may generate the search results 124 using the selected app state ID(s) 172. In these examples, the search results 124 may specify one or more states in one or more native or web-based apps. In other examples, the search system 100 may generate the search results 124 to include other types of information (e.g., that unrelated to states of native or web-based apps). In any case, in block 1006, the search system 100 transmits the search results 124 to the user device 102.

In block 1008, the messaging system 104 (e.g., the message ID module 114 in conjunction with the data store 116) determines whether the search query 118 includes a message. For example, as described herein, to make this determination, the messaging system 104 may determine that the search query 118 includes one or more of a reference to a person's name (e.g., a name included in a contacts list), a messaging slang (e.g., a messaging abbreviation) term, a messaging expression term, an emoticon, a punctuation character, a predetermined term, a predetermined phrase, a predetermined number of characters, a predetermined number of terms, and a predetermined usage of grammar. In some examples, the search system 100 includes, or be in communication with the messaging system 104, in which case the search system 100 may make the above-described determination. In other examples, the user device 102 may include, or be in communication with, the messaging system 104, in which case the device 102 may make the above-described determination.

In the event the search query 118 includes a message (i.e., the "YES" branch of block 1008), the method 1000 proceeds from block 1008 to blocks 1010-1012. In block 1010, the messaging system 104 generates a messaging result 126 that indicates a messaging app. For example, the messaging result 126 may indicate one of the messaging app(s) 208 included on the user device 102, or a messaging app not included on the device 102. In examples where the messaging result 126 indicates one of the messaging app(s) 208, the result 126 may be configured to, upon being selected by the user, cause the user device 102 to launch the app 208 indicated by the result 126. Alternatively, in examples where the messaging result 126 indicates a messaging app not included on the user device 102, the result 126 may be configured to, upon being selected by the user, cause the device 102 to download the app (e.g., from a digital distribution platform) using an ADA included in the result 126. Upon downloading the messaging app, the user device 102 may install and launch the app. As described herein, in some examples, the messaging system 104 generates the messaging result 126 such that the result 126 further indicates the message included in the search query 118 and/or a recipient for the message (e.g., in cases where the query 118 references a name of the recipient). In some examples, the messaging system 104 also generates one or more additional messaging results 126 that each indicate a messaging app, as described above.

In block 1012, the messaging system 104 transmits the messaging result 126 to the user device 102 (e.g., via the search system 100), in these examples, the search system 100 and messaging system 104 may transmit the search results 124 and the messaging result 126, respectively, to the user device 102 with link data, ad data, and/or one or more result scores, ranking values, or values of another ranking metric, such that the device 102 may display the results 124, 126 as user selectable links (e.g., ranked within a list).

Alternatively, when the search query 118 does not include a message (i.e., the "NO" branch of block 1008), the method 1000 proceeds from block 1008 directly to an end of the method 1000, thereby bypassing blocks 1010 and 1012 described above in other words, when the search query 118 does not include a message, the search system 100 transmits the search results 124 to the user device 102 without the messaging system 104 generating the messaging result 126 and transmitting the result 126 to the device 102.

The modules and data stores included in the search system 100 and the messaging system 104 represent features or functionality that may be included in these systems 100, 104 as they are described in the present disclosure. For example, the search module 108, data store 110, result generation module 112, and the components thereof may represent features included in the search system 100. Similarly, the message ID module 114, data store 116, and the components thereof may represent features included in the messaging system 104. The modules and data stores described herein may be embodied by electronic hardware, software, firmware, or any combination thereof. Depiction of different features or functionality as separate modules or data stores does not necessarily imply whether the modules or data stores are embodied by common or separate electronic hardware, software, or firmware components. In some examples, the features/functionality associated with one or more of the modules and data stores depicted herein are realized by common or separate electronic hardware, software, or firmware components.

The modules and data stores may be embodied by electronic hardware, software, and/or firmware components including one or more processing units, memory components, input/output (I/O) components, and interconnect components. The interconnect component(s) may be configured to provide communication between the processing unit(s), memory component(s), and I/O component(s). For example, the interconnect component(s) may include one or more buses configured to transfer data between electronic components. The interconnect component(s) may also include one or more control circuits (e.g., a memory controller and/or an I/O controller) configured to control communication between electronic components.

The processing unit(s) may include one or more central processing units (CPUs), graphics processing units (GPUs), digital signal processing units (DSPs), app specific integrated circuits (ASICs), field programmable gate arrays (FPGAs), and/or other processing units. The processing unit(s) may be configured to communicate with the memory component(s) and I/O component(s). For example, the processing unit(s) may be configured to communicate with the memory component(s) and I/O component(s) via the interconnect component(s).

A memory component, or memory, as described herein may include any volatile or non-volatile media. For example, a memory component may include any electrical media, magnetic media, and/or optical media, such as random access memory (RAM), non-volatile RAM (NIVRAM), read-only memory (ROM), electrically-erasable programmable ROM (EEPROM), Flash memory, solid state drives (SSDs), hard disk drives (HDDs), magnetic tape drives, optical storage technology (e.g., compact disc (CD), digital versatile disc (DVD), and/or Blu-ray Disc), and/or any other equivalent or similar memory components.

As such, the memory component(s) may include (e.g., store) various types of data. For example, the memory component(s) may store data included in one or more of the app state record(s) of the data store 110 and the LUTs, or lists, of the data store 116. The memory component(s) may also include one or more instructions that may be executed by the processing unit(s). For example, the memory component(s) may include one or more computer-readable instructions that, when executed by the processing unit(s), cause the unit(s) to perform the various functions attributed to the modules and data stores described herein.

The I/O component(s) may refer to electronic hardware, software, and/or firmware that provide communication with a variety of different devices. For example, the I/O component(s) may provide communication between other devices and the processing unit(s) and memory component(s). In some examples, the I/O component(s) are configured to communicate with a computer network, such as the network 106. For example, the I/O component(s) may be configured to exchange data over a computer network using any of a variety of different physical connections, wireless connections, and protocols. The I/O component(s) may include one or more network interface components (e.g., a network interface controller), repeaters, network bridges, network switches, routers, and firewalls. In some examples, the I/O component(s) include hardware, software, and/or firmware configured to communicate with various human interface devices, including display screens, keyboards, pointer devices (e.g., a mouse), touchscreens, speakers, and microphones. In other examples, the I/O component(s) may provide communication with additional devices, such as external memory (e.g., external HDDs).

In some examples, the search system 100 and/or the messaging system 104 is a system of one or more computing devices (e.g., a computer-based search system including a messaging system or component) configured to implement the techniques described herein. In other words, the features or functionality attributed to the modules and data stores described herein may be implemented by one or more computing devices. Each of the computing device(s) may include any combination of electronic hardware, software, and/or firmware, as described above. Additionally, each computing device may include any combination of processing units, memory components, I/O components, and interconnect components, as also described above. The computing device(s) of any of the systems 100, 104 may also include various human interface devices, including display screens, keyboards, pointing devices (e.g., a mouse), touchscreens, speakers, and microphones. The computing device(s) may also be configured to communicate with additional devices, such as external memory (e.g., external HDDs).

The computing device(s) of any of the search system 100 and messaging system 104 may be configured to communicate with the network 106. The computing device(s) may also be configured to communicate with one another (e.g., within any of, or between, the systems 100,104) via a computer network. In some examples, the computing device(s) include one or more server computing devices configured to communicate with the user device 102 (e.g., receive user inputs/search queries and transmit search results and messaging results). The server computing device(s) may also gather data from data sources, index the data, and store the data, as well as gather, index, and/or store other documents or information. The computing device(s) of any of the systems 100, 104 may reside within a single machine or within multiple machines at a single geographic location, or may be distributed across a number of geographic locations.

Additionally, the various implementations of the search system 100 and messaging system 104 described above (e.g., using one or more computing devices that include one or more processing units, memory components, I/O components, and interconnect components) are equally applicable to the user device 102 and the various components thereof described herein.

What is claimed is:

1. A method comprising:
receiving, by a user device, a user input;
determining, by the user device, whether the user input includes a messaging term or search term based on whether the user input includes a text which is included in a previous message sent to an external device prior to the receiving of the user input;
when the user input includes the messaging term,
generating, by the user device, a messaging result that indicates a messaging application (app), and
displaying the messaging result on a display of the user device; and
when the user input includes the search term,
transmitting, by the user device, the search term to a search system,
receiving, by the user device, search results of the search term from the search system, and
displaying, by the user device, the search results on the display without displaying the messaging result,
wherein the messaging result includes one or more of:
at least a portion of a name of the messaging app,
at least a portion of the messaging term included in the user input,
at least a portion of a name referenced by the user input and associated with contact information stored on the user device, or
an indication that the messaging result is different from the search results.

2. The method of claim 1, wherein determining whether the user input includes the messaging term comprises determining whether the user input references a person's name.

3. The method of claim 2, wherein determining whether the user input references a person's name comprises determining whether the user input references the name associated with contact information stored on the user device.

4. The method of claim 1, wherein determining whether the user input includes the messaging term comprises determining whether the user input includes at least one of:
a messaging slang term;
a messaging abbreviation term;
a messaging expression term;
an emoticon; or
a punctuation character.

5. The method of claim 1, wherein determining whether the user input includes the messaging term comprises determining whether the user input includes at least one of:
one or more predetermined terms;
one or more predetermined phrases;
a predetermined number of characters;
a predetermined number of terms; or
a predetermined usage of grammar.

6. The method of claim 1, wherein the messaging result indicates whether the messaging app indicated by the messaging result is installed on the user device.

7. The method of claim 1,
wherein the messaging app indicated by the messaging result is installed on the user device, and
wherein the messaging result includes a graphical user interface (GUI) element configured to cause the user device to launch the messaging app upon a user of the user device selecting the GUI element on the user device.

8. The method of claim 1,
wherein the messaging app indicated by the messaging result is not installed on the user device,
wherein the messaging result includes an app download address (ADA) specifying a location at which the messaging app can be downloaded, and
wherein the messaging result further includes a graphical user interface (GUI) element configured to direct the user device to the location using the ADA upon a user of the user device selecting the GUI element on the user device.

9. The method of claim 8, wherein the messaging result further includes a GUI element that indicates an advertisement associated with the messaging app indicated by the messaging result.

10. The method of claim 1, wherein displaying the messaging result on the display comprises:
displaying a graphical user interface (GUI) element on the display, wherein the GUI element is configured to cause the user device to display one or more messaging results, including the messaging result, that each indicate a messaging app at the user device upon a user of the user device selecting the GUI element on the display;
receiving, by the user device, a user selection of the GUI element; and
in response to receiving the user selection, displaying the one or more messaging results, including the messaging result, on the display.

11. The method of claim 10, wherein each of at least one of the one or more messaging results, including the messaging result, further includes one or more of:
an indication of whether the corresponding messaging app is installed on the user device;
a first GUI element configured to cause the user device to launch the corresponding messaging app upon a user of the user device selecting the first GUI element on the display;
an ADA specifying a location at which the corresponding messaging app can be downloaded;
a second GUI element configured to direct the user device to the location using the ADA upon the user selecting the second GUI element on the display; or
a third GUI element that indicates an advertisement associated with the corresponding messaging app.

12. The method of claim 1,
wherein the messaging result includes a graphical user interface (GUI) element configured to cause the user device to display one or more names associated with contact information stored on the user device on the display of the user device upon a user of the user device selecting the GUI element on the display, and
wherein, upon the user selecting any of the one or more names on the display, the user device is configured to select the name as a recipient for the message.

13. The method of claim 1, wherein the messaging app indicated by the messaging result is installed on the user device, the method further comprising:
receiving, by the user device, a user selection of the messaging result; and in response to receiving the user selection, launching the messaging app on the user device.

14. The method of claim 13, further comprising, after launching the messaging app, inserting the message included in the user input into a message input field of the messaging app,
wherein the message input field is configured to receive messages from users of the messaging app.

15. The method of claim 13,
wherein the user input references a name associated with contact information stored on the user device, the method further comprising, after launching the messaging app, inserting the name into a recipient input field of the messaging app, and
wherein the recipient input field is configured to receive one or more recipient names from users of the messaging app.

16. The method of claim 1,
wherein the messaging app indicated by the messaging result is not installed on the user device, and
wherein the messaging result includes an ADA specifying a location at which the messaging app can be downloaded, the method further comprising:
receiving, by the user device, a user selection of the messaging result; and
in response to receiving the user selection, directing the user device to the location using the ADA.

17. The method of claim 16, further comprising:
downloading, by the user device, the messaging app from the location; and
installing, by the user device, the messaging app.

18. The method of claim 16,
wherein the messaging result further includes a graphical user interface (GUI) element that indicates an advertisement (ad) associated with the messaging app indicated by the messaging result,
the method further comprising:
receiving, by the user device, a user selection of the GUI element; and
in response to receiving the user selection, displaying the ad on the display of the user device.

19. A system comprising one or more computing devices configured to:
receive, by a computing device, a user input;
determine, by the computing device, whether the user input includes a messaging term or search term based on whether the user input includes a text which is included in a previous message sent to an external device prior to the receiving of the user input by the computing device;
when the user input includes the messaging term,
generate, by the computing device, a messaging result that indicates a messaging application (app), and
display, by the computing device, the messaging result; and
when the user input includes the search term,
refrain, by the computing device, from generating the messaging result,
transmit, by the user device, the search term to a search system,
receive, by the user device, search results of the search term from the search system, and
display, by the computing device, the search results without displaying the messaging result.

20. A system comprising one or more computing devices configured to:
receive, by a computing device, a search query from a user device;
generate, by the computing device, search results based on the search query;
transmit, by the computing device, the search results to the user device;
determine whether the search query includes a messaging term based on whether the user input includes a text which is included in a previous message sent to an external device prior to the receiving of the user input;
when the search query includes the messaging term, generate, by the computing device, a messaging result that indicates a messaging application (app), and transmit, by the computing device, the search results and the messaging result to the user device; and
when the search query does not include the messaging term, refrain, by the computing device, from generating the messaging result, and transmit the search results to the user device without transmitting the messaging result.

21. A non-transitory computer-readable storage medium comprising instructions that cause one or more computing devices to:
receive, by a computing device, a user input;
determine, by the computing device, whether the user input includes a messaging term or search term based on whether the user input includes a text which is included in a previous message sent to an external device prior to the receiving of the user input;
when the user input includes the messaging term,
generate, by the computing device, a messaging result that indicates a messaging application, and
display, by the computing device, the messaging result; and
when the user input includes the search term,
transmit, by the computing device, the search term to a search system,
receive, by the computing device, search results of the search term from the search system, and
display, by the computing device, the search results without displaying the messaging result,
wherein the messaging result includes one or more of:
at least a portion of a name of the messaging app,
at least a portion of the messaging term included in the user input,
at least a portion of a name referenced by the user input and associated with contact information stored on the user device, or
an indication that the messaging result is different from the search results.

22. A non-transitory computer-readable storage medium comprising instructions that cause one or more computing devices to:
receive, by a computing device, a search query from a user device;
generate, by the computing device, search results based on the search query;
transmit, by the computing device, the search results to the user device;
determine, by the computing device, whether the search query includes a messaging term based on whether the user input includes a text which is included in a previous message sent to an external device prior to the receiving of the user input;
when the search query includes the messaging term,
generate, by the computing device, a messaging result that indicates a messaging application, and transmit, by the computing device, the search results and the messaging result to the user device; and when the search query does not include the messaging term,
- refrain, by the computing device, from generating the messaging result, and
- transmit, by the computing device, the search results to the user device without transmitting the messaging result.

* * * * *